US009639901B2

(12) United States Patent
Montoya et al.

(10) Patent No.: US 9,639,901 B2
(45) Date of Patent: May 2, 2017

(54) GEO-LOCATION SYSTEMS AND METHODS

(76) Inventors: David Montoya, Brooklyn, NY (US); Hagai Yardeny, Brooklyn, NY (US)

(*) Notice: Subject to any disclaimer, the term of this patent is extended or adjusted under 35 U.S.C. 154(b) by 945 days.

(21) Appl. No.: 13/340,476

(22) Filed: Dec. 29, 2011

(65) Prior Publication Data
US 2012/0271883 A1 Oct. 25, 2012

Related U.S. Application Data

(60) Provisional application No. 61/429,433, filed on Jan. 3, 2011.

(51) Int. Cl.
*G06F 15/16* (2006.01)
*G06Q 50/00* (2012.01)
*H04L 12/58* (2006.01)
*H04L 29/08* (2006.01)
*H04W 4/02* (2009.01)
*H04W 4/20* (2009.01)

(52) U.S. Cl.
CPC ............ *G06Q 50/01* (2013.01); *H04L 51/20* (2013.01); *H04L 51/32* (2013.01); *H04L 67/18* (2013.01); *H04L 67/306* (2013.01); *H04W 4/023* (2013.01); *H04W 4/028* (2013.01); *H04W 4/206* (2013.01)

(58) Field of Classification Search
CPC ......... H04L 51/32; H04L 51/20; H04L 67/18; H04L 67/306; H04W 4/023
USPC .......................................................... 709/204
See application file for complete search history.

(56) References Cited

U.S. PATENT DOCUMENTS

| 6,509,830 | B1 | 1/2003 | Elliott |
| 6,618,593 | B1 | 9/2003 | Drutman et al. |
| 8,676,273 | B1* | 3/2014 | Fujisaki ..................... 455/567 |
| 2002/0002053 | A1 | 1/2002 | Nam et al. |
| 2003/0076354 | A1* | 4/2003 | Yeh ................... G06Q 10/10 715/751 |
| 2003/0233549 | A1* | 12/2003 | Hatakeyama ....... H04L 63/0428 713/170 |
| 2005/0054352 | A1* | 3/2005 | Karaizman ....... H04M 3/42008 455/456.3 |
| 2007/0156664 | A1 | 7/2007 | Norton et al. |
| 2007/0167136 | A1* | 7/2007 | Groth ................... G06Q 10/109 455/41.2 |
| 2007/0282621 | A1* | 12/2007 | Altman et al. .................... 705/1 |
| 2008/0147884 | A1* | 6/2008 | Kwon .................... G06Q 99/00 709/243 |
| 2008/0188261 | A1 | 8/2008 | Arnone |

(Continued)

OTHER PUBLICATIONS

International search report and written opinion dated Jul. 30, 2012 for PCT/US2011/067983.

(Continued)

*Primary Examiner* — Richard G Keehn
(74) *Attorney, Agent, or Firm* — Wilson Sonsini Goodrich & Rosati

(57) ABSTRACT

Systems and methods are provided for matching a first user in a first geographic location with a second user in a second geographic location, and enabling the first user to find the second user in the second geographic location. The first geographic location can be the same as the second geographic location. The first user and second user can be matched based on user-specific matching criteria, including a first user profile of the first user and a second user profile of the second user. The first user can communicate with the second user.

21 Claims, 34 Drawing Sheets

(56) References Cited

U.S. PATENT DOCUMENTS

2009/0327013 A1* 12/2009 McGovern ............. G06Q 10/10
                                                        705/321
2010/0205541 A1*  8/2010 Rapaport et al. ............. 715/753
2010/0287103 A1  11/2010 Mason
2011/0106719 A1*  5/2011 Wang et al. .................. 715/764
2011/0142016 A1   6/2011 Chatterjee

OTHER PUBLICATIONS

Aimonetti. Apple wants to help you find your friends. Sep. 7, 2011. Accessed: Jan. 20, 2012. http://reviews.cnet.com/8301-19512_7-20102697-233/apple-wants-to-help-you-find-your-friends.
Foursquare website. Accessed: Jan. 20, 2012. https://foursquare.com/.
Gowalla website. Accessed: Jan. 20, 2012. http://gowalla.com/.
Kim. Apple Researching How the iPhone Can Help You Make New Friends. Jun. 16, 2011. Accessed: Jan. 20, 2012. http://www.macrumors.com/2011/06/16/apple-researching-how-the-iphone-can-help-you-make-new-friends.
Kim. New iOS Feature Coming. 'Find My Friends'. Jan. 12, 2011. Accessed: Jan. 20, 2012. http://www.macrumors.com/2011/01/13/new-ios-feature-coming-find-my-friends/.
Tsotsis. Sonar Finds You The Most Relevant People In The Room. May 23, 2011. Accessed: Jan. 20, 2012. http://techcrunch.com/2011/05/23/sonar-finds-you-the-most-relevant-people-in-the-room/.

* cited by examiner

300

GEO-LOCATION SYSTEMS AND METHODS

CROSS-REFERENCE

This application claims priority to U.S. Provisional Patent Application No. 61/429,433, filed Jan. 3, 2011, which is entirely incorporated herein by reference.

BACKGROUND OF THE INVENTION

A location-based service ("LBS") is an information and entertainment service, accessible with mobile devices through a mobile network, and utilizing the ability to make use of the geographical (or "geographic") position or location of the mobile device. LBS services can be used in a variety of contexts, such as health, work and personal life. LBS services include services to identify a location of a person or object, such as discovering the nearest banking cash machine or the whereabouts of a friend or employee. Real-time locating systems ("RTLS") can be used to track and identify the location of objects in real time using nodes (or badges, tags) attached to, or embedded in, objects and devices (readers) that receive the wireless signals from these tags to determine their locations. RTLS typically refers to systems that provide passive or active (automatic) collection of location information.

A geographical location (or geolocation) method can be used to identify the real-world geographic location of an object, such as a cell phone or an Internet-connected computer terminal. Geo-location can refer to the practice of assessing the location of an object, or to the actual assessed location of the object.

Mobile positioning is technology for determining or approximating the location of a mobile device, such as a mobile phone, and thereby also a user of the mobile device. Mobile positioning is a type of LBS. Mobile positioning of mobile phones is typically accomplished by measuring power levels and antenna patterns, and using the notion that a mobile phone communicates wirelessly with the closest base stations to determine or approximate the geographic location (also "geo-location" herein) of a user. Advanced geo-location systems can determine the sector in which the mobile phone resides and roughly estimate also the distance to the base station. Further approximation of the location of a mobile device can be performed by interpolating signals between neighboring base stations.

SUMMARY OF THE INVENTION

While there are geo-location systems available in the art, such methods have shortcomings and limitations, such as, for example, not matching users in a user-selected geographic location, and not enabling users to maintain privacy control at various levels of interaction. Geo-location systems and methods described herein advantageously enable a user to search for other users in a user-selected geographic location while enabling the user to maintain control over the user's privacy. In an embodiment, the system enables the user to maintain control over the information the user makes available (or provides) to other users. In another embodiment, the user maintains control over the information the user shares with other users, when the user shares such information, and with whom the user shares such information.

Provided herein are computer-implemented geographical location ("geo-location") methods for searching for users, matching users and bringing users together. Users can be searched for and matched in a user-selected geo-location based on user-specific matching criteria. This can permit geo-targeting users.

An aspect of the invention provides a computer-implemented method for bringing users together, comprising communicating with a first computer system associated with a first user having a first user profile, the first user disposed in a first geographic location; communicating with a second computer system associated with a second user having a second user profile, the second user disposed in a second geographic location; and matching the first user and the second user based on user-specific matching criteria, the user-specific matching criteria including the first user profile and the second user profile.

In an embodiment, a computer-implemented method for locating users comprises matching a first user and second user in a predetermined geographic location, wherein the first user and the second user are searched for and matched based on user-specific criteria.

In another embodiment, computer-implemented method for matching users comprises forming a group of users in a user-selected geographic location, the group of users formed based on user-specific matching criteria.

Another aspect of the invention provides a computer-implemented method for finding users by communicating with one or more computer systems of one or more users, each of the one or more users having a user profile. The one or more users are disposed in a user-selected geographic location. Next, users are searched based on user-specific matching criteria. The user-specific matching criteria include the user profile of each of the one or more users.

Another aspect of the invention provides geo-location systems. Systems can be provided on a central system for communicating with electronic devices of one or more users, or operating on an electronic device of individual users, or both. Systems can include a user interface ("UI"), such as a graphical user interface ("GUI"), for permitting a user to interact with the system.

In an embodiment, a system for geo-locating users comprises a profile module for storing user profiles, the user profiles including one or more user-specific selection criteria; a communication module for communicating with computer systems associated with a plurality of users; and a user-matching module for matching a first user with a second user within a user-selected geographic location.

Another aspect of the invention provides methods for communicating with users. In some embodiments, methods are provided to enable a first user to send (or transmit) a message to another user with certain profile information selected by the first user to provide to the second user.

In an embodiment, a method for communicating with a user comprises preparing a message to a user; selecting one or more profile information to include with the message; and transmitting the message and the one or more profile information to the user.

In some embodiments, a user can geo-locate other users in a user-selected geographic location. In an embodiment, methods are implemented by a geo-location system. In an embodiment, the system enables a user to send messages to other users. A message can be provided to other users in the same language or different languages. In another embodiment, the system enables users to find businesses and other people. In another embodiment, the system is enabled for reputation management (e.g., repvine). In such a case, the system can include a reputation management sub-system or module to enable a user to manage (e.g., view) the reputation of the user. In another embodiment, the system is enabled for games, such as a Marco Polo game for finding other users in a user-selected geographic location. In another embodiment, the system is configured to receive Twitter® feeds. In another embodiment, the system is configured for facial recognition matches. In another embodiment, the system is configured to interact with other social networks, such as Facebook®, LinkedIn, Twitter, Google+, Foursquare, Gowalla and/or MySpace®. In another embodiment, the system is enabled to permit a user to sign in via a single sign-in and enable the user to select a profile from a drop-down menu. In another embodiment, the system provides user access via the Internet, such as a web site. Users can sign on and manage their profiles and search for other users. In another embodiment, the system is enabled to permit a user to send invites to other users via electronic mail ("e-mail"), short message service ("SMS") text, multimedia messaging service ("MMS") text, and/or a phone call. In another embodiment, the system is configured to interact with a Bluetooth bracelet. In another embodiment, the system is configured to interact with a Bluetooth auto banner. In another embodiment, the system is configured to provide users rewards. In another embodiment, the system is configured to expand profile information, such as with the aid of a wizard, so that users can fill in the information. In some cases, the system can provide users points for providing information. In another embodiment, the system includes a distance tracker Systems and methods provided herein can include various other features, including one or more of the following: enabling users to create "societies" or "communities"; allow 3rd party developers to add to the system; allow attachments; provide to-do items or events items (which can be based on a user's geographic location); allow users to forward profiles of other users to one another; allow businesses to use a Bluetooth band instead of wrist bands; have "shake" functionality, which can enable other phone to interact with a user's phone upon the user shaking the user's phone; enable users to upload picture profiles to replace or update their social network profiles (e.g., Facebook® profile, Google+profile, MySpace® profile, Linkedin® profile, Gowalla profile, or Foursquare profile); enable MySpace, Facebook, Google+, Foursquare, Gowalla and/or Linkedin profile loads; provide business logo (ala on a business card); directly create a photo wallet; voice over internet protocol ("voip") calls; various games; amber alerts; emergency notification or alert; "wave" messages; a six degrees of separation game; a celebrity look-alike game; provide an "acquaintances" category; provide an eye spy with my little eye game; provide astrology to matches; enable a user to add a business card; enable a user to upload contacts; suggest real-time, geo targeted matches for a relationship based on users criteria (dating/matchmaking service); suggest business relationships based on a user's criteria (business services, products, etc.); enables users to add icons or avatars to replace or supplement profile information; have featured advertisers when a map search is used; premium users can store their past "history" of where they have been and who they have met or passed by.

Systems and methods provided herein can provide various third-party features, such as advertising space, which can be coupled with enabling advertising entities to provide location-based advertising (e.g., alcohol advertising when a user is in a bar or lounge).

Systems and methods provided herein can provide various usage metrics, such as the time taken for a user to find and meet one or more other users, and the length of time a user spends with another user. This can enable the system to find the fastest way for a user to find another user in a user-selected geographic location.

Other features of systems provided herein can include one or more of the following: offering employers time clock functionality to track employees and protect them; providing job hunting referrals for users; adding advertisements into a user's profile list based on likes or similarities; send or receive emoticons (e.g., smiley face or sad face to indicate mood); enable video chat with one or more other users (e.g., group chat); allowing users to send invites from the address book contacts on the phone; enabling users to link their phones to one another; providing features for hearing-impaired users; providing maps customizable with one or more skins; provide ways for a multiple level structure to have a "map presence" so that an office building can identify where people are in a building; adding visually appealing items to the location; making a particular location a user's virtual home or office; creating boxes and including other members in the boxes; creating personalized maps; requesting help or assistance from other users; getting better coupons or deals based on the number of other users within a user's network sign up for a particular offer; sending and receiving virtual gifts; earning or purchasing virtual points from the system; enabling students to post their classes and instructors; enabling users to post meta tags; enabling users to setup spaces, such as meeting rooms, offices, homes, parks, and move their friends or contacts into such spaces; enabling users to import their contacts into the system, such as into users' friends lists; enabling users to disable their profiles from view after a predetermined amount of time; enabling a user to receive a notification whenever someone looks at the user's profile after a predetermined amount of time; enabling to report abuse and spammers; allowing users to customize the look and feel of their system interface, such as with the aid of skins; allowing users to form groups and request discounts, coupons and special offers from businesses; enabling a user to scroll a banner that provides information to the user; enabling a user to navigate a user interface of the system with the aid of a dock that has a magnification tool and which can disappear; and enabling stores and businesses to provide advertisements to a user when the user is in a predetermined geographic location; enabling clubs and events to create walls or boards.

A geo-location system includes a user interface ("UI") that permits a user to interact with various modules of the geo-location system. The UI can be for use with various electronic devices, including mobile (or portable) electronic devices (e.g., Droid® enabled telephone, iPhone, iPad, Blackberry, a Windows telephone).

Geo-location systems provided herein can provide users with various other features, such one or more of the following: permitting the user to set various dead zones that prevent other users from assessing the user's location when the user is at a certain location; providing a user the capability to not appear in other users' searches or on other users' maps for a certain period of time or within a certain time period; enabling businesses to tag locations on a map; providing games, such as tic-tac-toe, for users to play in a user-selected geographic location; enabling businesses to claim a listing on a map; enabling users to attach photos to taps and messages; and enabling users to attach short vides to taps and messages.

Geo-location (also "geolocation" herein) systems and methods provided enable various functionalities. In an embodiment, a user can send an invite from an address book or other contact list of the user to another user. In another embodiment, a user can differentiate users on a map based on the colors of pins, such as pins of a first color for friends, pins of a second color for friends of friends, and pins of a third color for random users. In another embodiment, a user can elect to be hidden from view by other users, such as for a predetermined period of time (e.g., time of day, length of time). In another embodiment, a user can use rolling settings to determine distance radius to search for friends and potential friends (e.g., from up to 15 yards to 50 miles or more). In another embodiment, a user can a social network profile of the user to the geolocation system. In another embodiment, a user can elect to be hidden from view by other users when the user is home or at a predetermined location. In such a case, other users will be unable to view the user's geolocation. In another embodiment, a system administrator or the system can prevent a user from using the geolocation system when the administrator, the system or other users determine that the user is abusing the system. In some cases, other users can report abuse (e.g., spammers) to a system administrator operating the geolocation system. In another embodiment, a graphical user interface (GUI) of the system includes a home button, which can have various shapes (e.g., house). In another embodiment, a user has a single sign in and is able to select a profile from a drop-down menu. In another embodiment, the geolocation system enables a user to earn points, which can be used for transactions, such as store purchases. In another embodiment, the geolocation system enables companies or entities (e.g., businesses, users) to "tag" locations on a map accessible by a user. In another embodiment, a business can claim a listing on a map. In another embodiment, a user can "like" or "dislike" a geographic location, such as a business. In another embodiment, a user is able to provide a status update on a profile of the user or a user group. In another embodiment, a user can indicate a location the user has visited, the user's present location, and/or a location the user is intending to visit, including, in some cases, the date and time of the visit.

In another embodiment, once a first user has found a second user, the system provides the first user directions (e.g., driving, walking, or public transportation directions) to the location of the second user. In another embodiment, the system provides a user a mystery profile, and the user can guess the identity of a user having the mystery profile, such as a celebrity user. In another embodiment, the system provides walls for clubs, events and the like. In some cases, users interacting with such walls can be provided promotions. In another embodiment, the system can provide a user an alert or notification on likes and interests. In another embodiment, the system can serve up local advertisements. In an embodiment, the system can allow users to search advertisements based on distance, time and user interests. In another embodiment, the system can allow a user to search for various items of interest to the user, such as apparel, shoes, and/or sports equipment. In another embodiment, the system can match users based on social graph. In some cases, users can input their priorities and/or preferences, which can enable users to find users with similar interests to communicate with.

In an embodiment, the system enables users and/or businesses to post advertisements. In another embodiment, the system enables users to post coupons. The coupons can be location-based coupons. In another embodiment, the system enables a user to update and view a buzz history of the user or another user. In another embodiment, the system enables the user to view waves and/or messages that are provided to and/or from other users. In another embodiment the system enables a user to send emergency alerts and/or notifications, such as Amber alerts. In another embodiment, the system enables users to set alerts (for notification by the system) based on various user-specific factors, such as the user's likes, hometown, and friends. Such alerts can enable the system to notify the user when, for example, a particular user is in proximity to the user. In some cases, an alert can notify a first user when a second user selected by the first user is a predetermined distance from the first user. In another embodiment, a graphical user interface (GUI) of an electronic device of the user can rotate in response to the user rotating the electronic device. In some cases, upon the user rotating the electronic device, the GUI can display an image carousel with images of other users. In another embodiment, a GUI provides a map that is searchable. In another embodiment, a GUI provides a map that includes filters, such as search and/or view filters. In another embodiment, the system provides "buzz" that will show as a pin on the map. In another embodiment, the system provides client server check-in.

Some embodiments provide geolocation systems that are optimized for use on portable electronic devices. In an embodiment, the system is optimized for portable electronic device battery lifetime. In another embodiment, the system enables random connections upon a user shaking the user's portable electronic device. In another embodiment, a GUI of the system enables a user to move through screens with the aid of the user's fingers, such as swiping through screens. In another embodiment, a user can swipe sideways to toggle views from list to map, map to user interests, and so on.

In another embodiment, a user can customize sounds for one or more alerts set by the user. In another embodiment, a user can send alerts. In another embodiment, a user can customize links to businesses. In such a case, when a user enters a particular businesses, the business is notified of the user's presence. In another embodiment, the systems alerts the user when the user walks into, or in proximity to, a business of venue of interest to the user.

In an embodiment, a business can put a location of where its products are sold (e.g., Pillsbury can be placed in a supermarket). A user can be part of a group near the area where the user is located. The business can then interact with its customers.

In an embodiment, the system posts status updates on a social network profile (e.g., Facebook® profile, Google+ profile, Foursquare profile, Gowalla profile) of the user, such as when the user adds a new friend or visits a particular geolocation. In some cases, the system updates the user's social network(s) whenever the user's visibility status changes, such as from hidden to not hidden. In some cases, such status updates are viewable by friends or a social network of the user.

In an embodiment, the system provides a short video of a user for view by other users. In another embodiment, the system provides meet-up directions, such as walking and/or driving directions from one user to another user. In another embodiment, the system enables a user to request assistance (e.g., help) from another user, such as in retail locations. In another embodiment, the system provides a roll-call feature, in which case a user can report future locations of the user, such as planned locations. Such roll-call can be broadcasted to other users designated by the user. In another embodiment, a user can email or print reports about information that they have, such as the number of users nearby during a date period, or the number of friends (or "buddies") during a particular period. This can enable businesses to gather marketing information about users.

In another embodiment, the system enables a user to group messages with other users. In such a case, the user you can see the distances of other users from the user as part the "log-in" or avatar (or profile) of the user. The user can see their distance in addition to their name, in addition to having the capability to text using the map feature and look at where people in the group text are located.

In some cases, users can sign-in with any social and receive streams of information from their own social networks (e.g., Facebook, Linkedin, Foursquare, Gowalla, Google+, Twitter, Myspace) and from the feeds of other users, in some cases even if the other users are not signed in to the system. In an example, a user can see everyone Tweeting around the user and invite them to join the user and communicate with the user with the aid of the geolocation system. In another embodiment, the user can see other users on "Like" and "Buzz" screens of a GUI of the system. In another embodiment, when a friend of a user goes to a location, the system provides the user an alert. In another embodiment, the user can set an alert such that when a user selected by the user or anyone goes to a location selected by the user, the user received an alert.

Systems provided herein enable various functionalities, such as providing a user a tally of the total number of users, such as at a particular geographic location. The total number of users can be for a particular time period selected by the user. Systems provided herein enable various dashboard functionalities, such as, without limitation, the total number of users, total users per day that use the system, messages sent and/or received, taps sent and/or received, alerts sent and/or received, age groups of users, genders of users, geographic locations of users, the total time the system was used by the user in a predetermined period of time, and the most used features by the user.

In some embodiments, a user can add, edit or delete user groups and/or other users to or from a users group.

In an embodiment, a user can search for and find other users based on the degree of separation from other users. For instance, a first user can select to search for users that are 1, 2, 3, 4, or 5 degrees removed from the first user.

In an embodiment, a first user can search for other users, and purchase an item (e.g., food or drink) for a second user selected from the other users. The system can notify the second user that the first user has purchased the item for the first user.

In an embodiment, a user can browse, navigate to or search for other users based on commonalities, such as shared likes, interests, friends, badges, education (e.g., classes, teachers or professors), employment, followers, work history, circles data, and/or degree of separation. In another embodiment, a user can browse, navigate to or search for other users based on the proximity of the user to other users.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent reference was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
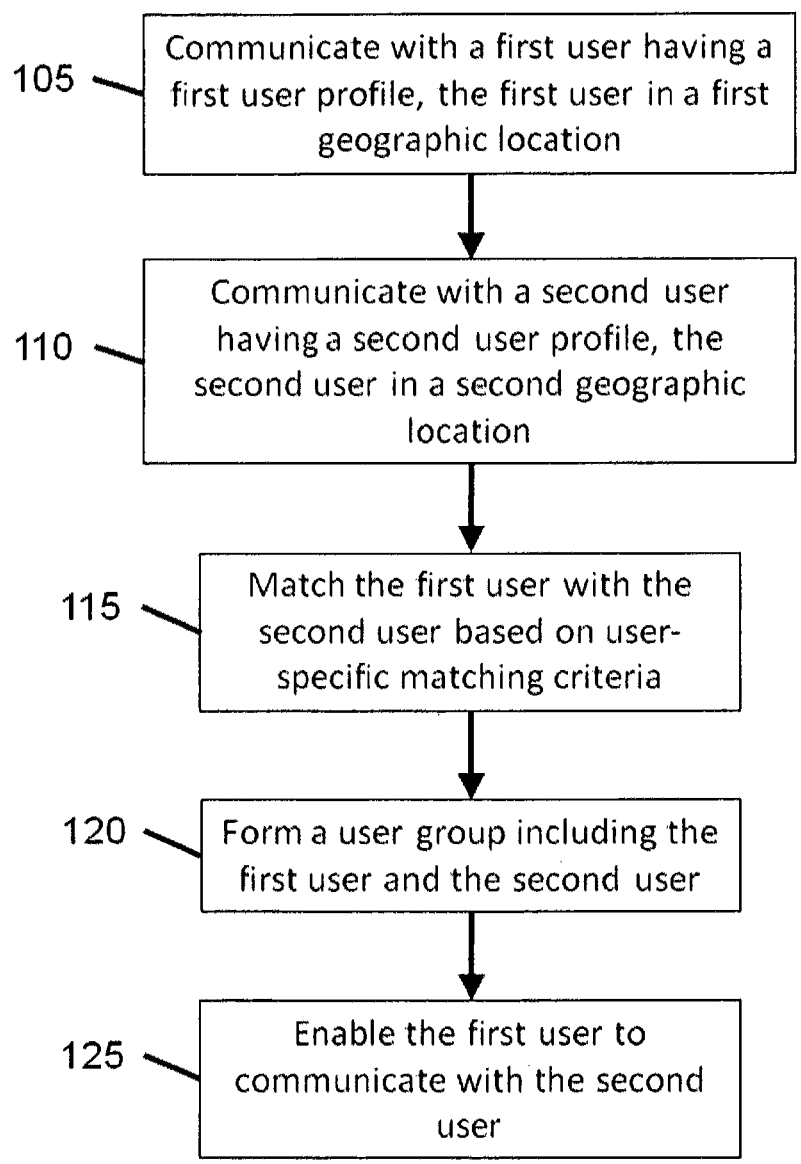
FIG. 1 shows a method for matching a first user and a second user, in accordance with an embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

The term "geolocation" (also "geo-location" herein), as used herein, refers to the real-world geographic location of an object. In some cases, geolocation can refer to the virtual geographic location of an object, such as in a virtual environment (e.g., virtual social network). A geolocation can be a geographical (also "geographic" herein) location of an object identified by any method for determining or approximating the location of the object. In some embodiments, the geolocation of a user can be determined or approximated using the geolocation of an object associated with the user, such as a mobile device is proximity to the user. In an embodiment, the geolocation of an object can be determined using the manner in which a mobile device associated with the object communicates with a node. In another embodiment, the geolocation of an object can be determined using node (e.g., wireless node, WiFi node, cellular tower node) triangulation. For example, the geolocation of a user can be determined by assessing the proximity of the user to a WiFi hotspot or one or more wireless routers. In another embodiment, the geolocation of an object can be determined using a global positioning system ("GPS"), such a GPS subsystem (or module) associated with a mobile device (e.g., GPS capabilities of an Apple® iPhone® or Droid® based system).

In some embodiments, a geographic location is a business, school, library, social venue (e.g., bar, lounge, dance hall), government building, or defense building or structure. A geographic location in some situations can be selected by a first user based on the location of other users, such as other users that the first user wants to interact with. A geographic location can be a public or private location, or a virtual location (e.g., a location within a FarmVille virtual environment). In some cases, a geographic location is an indoor or semi-indoor geographic location, such as may be bounded by one or more walls or enclosures.

The term "geotargeting" (or geo-targeting"), as used herein, refers to determining the geolocation of an Internet user and providing services to that user based on the user's location, such as address, school, workplace, restaurant, social club, bar, lounge, country, region, state, city, metro code/zip code, organization, internet protocol (IP) address, internet service provider (ISP), or other criteria. The user's location can be static or dynamic (e.g., a bus, subway, airplane). Geo-targeting can be used for online advertising.

The term "user-specific criteria", as used herein, includes information associated with or provided by a user. In some embodiments, user-specific criteria can include information relating to one or more of a user's interests, education, work and activities. In an embodiment, user-specific criteria can include profile information provided by a user. In another embodiment, user-specific criteria can include profile information associated with a user. In another embodiment, user-specific criteria can include information provided by a user.

The term "user-selected geographic location", as used herein, refers to a geographic location selected by one or more users. In an embodiment, users are physically located in a user-selected geographic location. In another embodiment, users' electronic devices are physically located in a user-selected geographic location. For example, a search by a first user for one or more other users in a user-selected geographic location can be conducted with the first user disposed in a geographic location (e.g., a café) selected by the first user. As another example, a search by a first user for one or more other users in a user-selected geographic location can be conducted with the first user and one or more other users disposed in a geographic location (e.g., a café) selected by the first user and one or more other users revealed by the search.

The term "tap", as used herein, refers to a communication from a first user to a second user. A tap can include a message in addition to one or more user-selected profile information selected by a user to transmit to one or more other users. Profile information can be selected by the user from a profile prepared by, or associated with, the user. In an embodiment, a tap can be a combination of a message and user profile information. In another embodiment, a tap can include a request for information from the second user. In an example, a tap includes a request for the second user's age, sex and location.

Some embodiments provide user-locating systems and methods for locating users within a predetermined area. In an embodiment, users are located based on one or more matching criteria. In another embodiment, users are located based on one or more user-specific matching criteria. Matching criteria can be selected from a users' interests, such as work interests, social interests, sports interests, entertainment interests, food interests and culinary interests; users' ages; users' level of education; users' social networks; and other matching criteria selected by the users and/or third parties, such as system administrators.

Methods and systems provided herein can be used to locate and match users in a predetermined location, such as an indoor location (e.g., bar, lounge, restaurant, library, classroom, lecture hall). In an example, a user enters an indoor location and searches for users with similar interests using a geolocation system on the user's Smartphone. The geolocation system presents a listing of users with similar interests in the indoor location, and provides the user the option to contact one or more of the users on the listing.

Methods and systems provided herein can be used for geo-targeting users. In an embodiment, geo-targeting (or "geotargeting") approaches can be useful in advertising to one or more users in a user-selected geo-location. In another embodiment, geo-targeting approaches can be useful in advertising to one or more users in a predetermined geo-location, such as a geolocation selected by one or more advertisers.

Systems provided herein can enable a first user to search for and locate one or more other users in a geographic location, such as a geographic selected by the first user. The geographic location can be located anywhere in the world, such as a city, state or country that is the same as that of the first user or different from the first user. In an example, the first user is located in New York city and searches for other uses in New York city or San Francisco. In another example, the first user is located in the United States and searches other users in Japan.

User Matching Methods

An aspect of the invention provides methods for locating users. In some embodiments, a computer-implemented method for bringing users together comprises communicating with a first user having a first user profile, the first user disposed in a geographic location, and communicating with a second user having a second user profile, the second user disposed in a second geographic location. The first user and the second user are matched based on user-specific matching criteria. In an embodiment, the user-specific matching criteria include the first user profile and the second user profile.

In an embodiment, a method for locating users comprises conducting a search for a first user with the aid of a geo-location system (such as any system provided herein), the search directed at finding one or more users in a user-selected geographic location. The search can be directed at finding users matching user-specific criteria provided by the first user. One or more other users can be matched to the first user if there is overlap between user-specific criteria provided by the first user and other users. In another embodiment, user-specific criteria can be provided by the first user before conducting the search. For example, the first user can input entertainment interests (e.g., movies, music), sports interests (e.g., "basketball"), work interests (e.g., law) and school interests (e.g., law school) in a search field provided by the system. As another example, the system can find one or more matches based on information provided by the first user in the first user's profile.

With reference to FIG. 1, a computer-implemented method 100 for geo-locating users is illustrated, in accordance with an embodiment of the invention. In a first step 105, a system for geo-locating users communicates with a first user having a first user profile. The first user is located in a first geographic location. Next, in a second step 110, the system communicates with a second user having a second user profile. The second user is located in a second geographic location.

In some embodiments, one or both of the first and second geographic locations is a predetermined location, such as a business, school, library, social venue (e.g., bar, lounge, dance hall), government building, or defense building or structure. A geographic location in some situations can be selected by a first user based on the location of other users, such as other users that the first user wants to interact with. A geographic location can be a public or private location, or a virtual location (e.g., a location within a FarmVille virtual environment). In some cases, the first geographic location is an indoor or semi-indoor geographic location, such as may be bounded by one or more walls or enclosures.

In some embodiments, the first geographic location is within about 1000 meters, 100 meters, 50 meters, 40 meters, 30 meters, 20 meters, 10 meters, 5 meters, 1 meters or less from the second geographic locations. A user can select the proximity of the first geographic location to the second geographic location. For instance, the first user can select a search parameter of about 10 meters, which would determine the proximity of the first user to the second user.

In an embodiment, the first step 105 and the second step 110 are performed sequentially, as illustrated. In another embodiment, the first step 105 and the second step 110 can occur simultaneously.

In an embodiment, the first geographic location is the same as the second geographic location. In another embodiment, the first geographic location and the second geographic location are predetermined geographic locations. In another embodiment, the first and second geographic locations are determined by the first user and second user, respectively. In another embodiment, the first geographic location and the second geographic are user-selected geographic locations. In another embodiment, the first geographic location and second geographic location can be a library, café, restaurant, bar, lounge, classroom, school, workplace, or other environment independently selected by the first user and second user. In another embodiment, the first geographic location and second geographic location can be a library, café, restaurant, bar, lounge, classroom, school, workplace, or other environment selected by the system for both the first user and second user—e.g., the system instructs the users to arrive at a common location in accordance with the users' interests, as provided in the users' profiles.

With continued reference to FIG. 1, in a third step 115, the system matches the first user and the second user. In some embodiments, the system conducts a search before matching the first user and the second user, the search conducted by one or both of the first user and the second user, the search directed at other users. In an embodiment, the system conducts a search for the first user or second user based on user-selected (also "user-determined" herein) search criteria, such as search criteria selected by the first user or second user.

In some embodiments, the users are matched based on user-specific matching criteria. In an embodiment, the user-specific matching criteria are determined based on the first profile and the second profile. In another embodiment, the user-specific matching criteria are selected from characteristics of the first user and the second user included in the first profile and second profile, respectively. In another embodiment, the user-specific matching criteria are equivalent to user-selected search criteria. In such a case, the system can match all users produced in a search using user-selected search criteria.

Next, in a fourth step 120, the system forms a user group including the first user and the second user. The user group can include other users matched with one or more of the first user and the second user. In an alternative embodiment, the fourth step 120 can be omitted.

Next, in a fifth step 125, the system can enable the first user to communicate with the second user. In an embodiment, the system can enable the first user to call the second user. In another embodiment, the system can enable the first user to text the second user. In another embodiment, the system can enable the first user to e-mail the second user. In another embodiment, the system can enable the first user to send an instant message ("IM") the second user. In another embodiment, the system can enable the first user to chat with the second user, such as with the aid of a text-based chat or Internet chat. In another embodiment, the system can enable the first user to chat with a plurality of other users (i.e., group chat).

In an embodiment, the system can provide the location of the second user to the first user, and vice versa, on a location indication tool, such as a map or a similar location visualization tool, including a two-dimensional or three-dimensional coordinate-based location visualization tool. A visualization tool can include a beacon to indicate the position of other users with the aid of sound or a visual indicator, such as a flashing light, with the frequency of the flashes corresponding to the proximity of the users to one another.

User Matching Systems

In another aspect of the invention, systems for locating users are provided. In some embodiments, a system for geo-locating users comprises a profile module (or subsystem) for storing user profiles, the user profiles including one or more user-specific selection criteria. The profile module can enable a user to build a user profile, modify the user profile, add information to the user profile, remove information from the user profile, and remove the user profile. Such information can include user interests, including social interests, sports interests, work interests, and entertainment interests; user work information; user education information; and user demographics information (e.g., age).

In an embodiment, the system further includes a communication module for communicating with computer systems associated with a plurality of users. In an embodiment, the communication module can communicate with mobile electronic devices (also "mobile devices" herein) of each of a plurality of users, such as, for example, a mobile phone (e.g., Smartphone) or portable electronic device of a user.

In an embodiment, the system further includes a user-matching module for matching a first user with a second user within a user-selected geographic location. The user-matching module can match users based on user-specific matching criteria. In another embodiment, the user-matching module can communicate with the profile module to access user profile information.

In an embodiment, upon accessing user profile information, the user-matching module determines whether there is overlap between a profile of a first user and a second user. In another embodiment, users can indicate user-specific matching criteria, such as one or more user characteristics of interests. If there is a match, the user-matching module can flag the match.

In an embodiment, if there is a match among a plurality of users, the system indicates the match. In another embodiment, upon a match, the system enables each of the plurality of users to find each other with the aid of their electronic devices (e.g., portable electronic device).

In some embodiments, the system further includes a location visualization module for displaying the location of one or more users. In an embodiment, the location visualization module is a map.

Figure 2A:
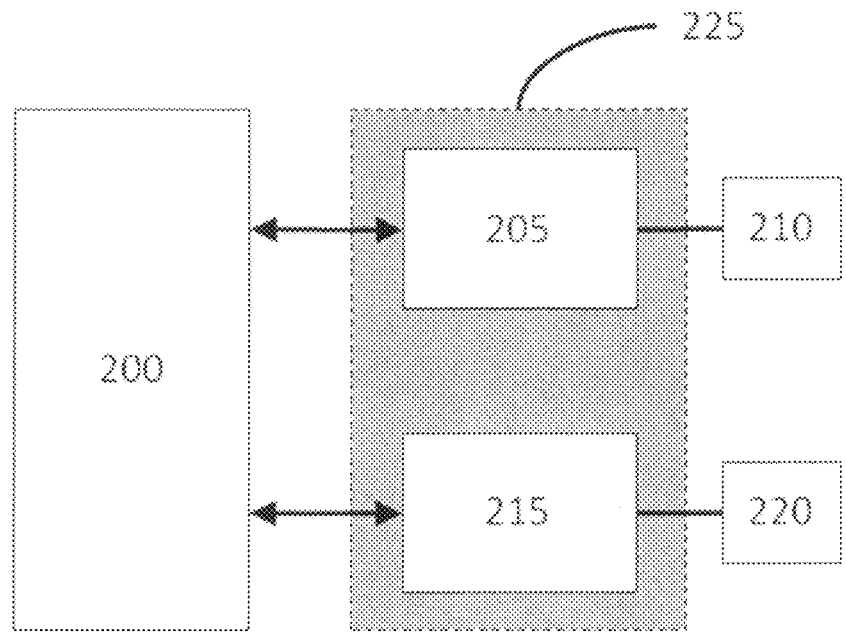
FIGS. 2A and 2B illustrate a system for geo-locating a first user and a second user, in accordance with an embodiment of the invention.
Figure 2B:
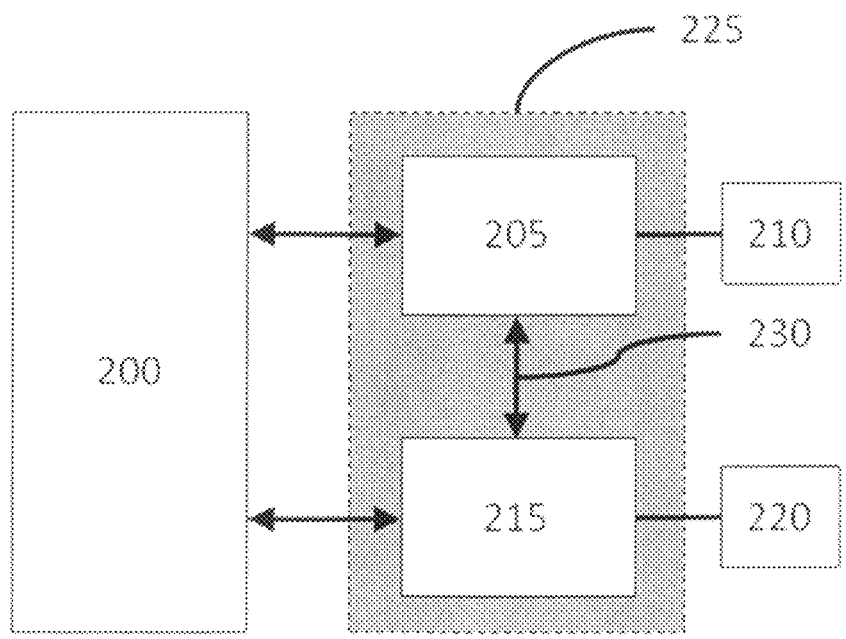

FIGS. 2A and 2B schematically illustrate a system for geo-locating users, in accordance with an embodiment of the invention. With reference to FIG. 2A, a system 200 is provided to communicate with one or more users or an electronic device associated with the one or more users. The system 200 can communicate with an electronic device of a first user 205, the first user having a first user profile 210. The system 200 can communicate with an electronic device of a second user 215, the second user having a second user profile 220. Each of the electronic devices of the first user 205 and the second user 215 can include software to enable the electronic device to communicate with the system 200. In an embodiment, such software can include an application software ("app"), such as a Smartphone app (e.g., iPhone app, Droid app). The software can enable the first user 205 and second user 215 to provide search criteria, matching criteria, profile information, locate groups and communicate with other users.

With continued reference to FIG. 2A, the first user profile 210 and second user profile 220 can be provided by the system 200. In an embodiment, the first user 205 and second user 215 are in a geographic location 225 selected by the first user 205 and second user 215. The geographic location 225 can be a user-selected geographic location. In another embodiment, the first user 205 and second user 215 are in a predetermined geographic location, which can be selected by the first user 205 and the second user 215.

With continued reference to FIG. 2A, the system 200 can determine if there is a match between the first user 205 and the second user 215. In an embodiment, the system 200 compares the first user profile 210 to the second user profile 220 to determine if there is a match based on predetermined matching criteria, such as overlap between the first profile 210 and the second profile 220, or criteria provided by the first user 205 and the second user 215 to the system 200. In another embodiment, the system 200 determines if there is a match between the first user 205 and the second user 215 based on criteria provided by the users, such as one or more searching criteria. In another embodiment, the system 200 determines if there is a match between the first user 205 and the second user 215 based on criteria provided by the users in real-time.

With reference to FIG. 2B, the system 200 has determined that there is a match 230 between the first user 205 and the second user 215 in the geographic location 225. In an embodiment, the system 200 can establish a link between the first user 205 and the second user 215. In another embodiment, the system 200 can provide the geographic location of the first user 205 to the second user 215, and vice versa. For example, the system 200 can indicate the location of the first user 205 on an electronic device of the second user 215. In another embodiment, the system 200 can enable the second user 215 to contact the first user 205, such as, for example, with the aid of e-mail, text, instant messaging, or phone.

In an embodiment, when the first user 205 or second user 215 leaves the geographic location 225, the system 200 terminates the link between the first user 205 and the second user 215. In such a case, the user that has remained in the geographic location 225 will be unable to locate the user that has left the geographic location 225.

In some embodiments, the system 200 can include hardware and software for locating users, matching users and forming a connection between users. In an embodiment, the system 200 can include a plurality of subsystems (or modules). In another embodiment, the system 200 can include one or more hardware selected from random access memory (RAM), read-only memory (ROM), hard disk, central processing unit (CPU), flash memory and cache. The system 200 can have one or more databases for storing user profiles. The databases can be included in, or associated with, a profile module of the system 200. In another embodiment, the system 200 can include an operating system, such as a Microsoft® Window® based OS, a Linux-based OS, a Google® Chromium-based OS, or any other operating system for managing the hardware of the system 200.

In an embodiment, the system 200 is configured to communicate with an electronic device associated with each user 205 and 215 with the aid of software installed on each of the electronic device. In another embodiment, the system 200 is configured to communicate with an electronic device associated with each user 205 and 215 with the aid of software provided by the system and accessible by the electronic devices with the aid of Internet-based browsers installed on each of the electronic devices. The software can be programmed using various programming languages, such as object-oriented (e.g., Java, C++, Objective C) and imperative (e.g., C) programming languages. In an embodiment, electronic devices associated with the users include apps for communicating with the system 200.

In an embodiment, the system 200 is installed on an electronic device of a user. In such a case, the system 200 can communicate with the same or similar system on another user's electronic device, thereby enabling users to search for and find other users.

With continued reference to FIGS. 2A and 2B, each user 205 and 215 can include an electronic device having a user interface ("UI") to permit each user to interact with the system 200. In another embodiment, an electronic device of each user 205 and 215 includes a UI that can permit each user 205 and 215 to interact with various modules of the system 200. The UI can be configured for use with various electronic devices, including mobile electronic devices, such as, e.g., an Apple® device (e.g., iPhone, iPad), a Droid-enabled device, a Microsoft operating system-enabled device, or a Blackberry device. In an embodiment, the electronic device of one user can be different from the electronic device of another user. For example, the first user 205 can have an iPhone® and the second user 215 can have a Windows® phone.

In some embodiments, the geographic location 225 is a location selected by both the first user 205 and the second user 215, such as a business, school, library, social venue (e.g., bar, lounge, dance hall), government building, or defense building or structure. A geographic location in some situations can be selected by the first user 205 or second user 215 based on the location of other users, such as other users that the first user 205 or second user 215 wants to interact with. A geographic location can be a public or private location, or a virtual location (e.g., a location within a FarmVille virtual environment). One or both of the first user 205 and second user 215 can set a search radius—only users within the search radius can be matched to the user. In some embodiments, the search radius is 1000 meters or less, 100 meters or less, 50 meters or less, 40 meters or less, 30 meters or less, 20 meters, 10 meters or less, 5 meters or less, or 1 meter or less. In other embodiments, the search radius is within 1 meter, or 5 meters, or 10 meters, or 20 meters, or 30 meters, or 40 meters, or 50 meters, or 100 meters, or 500 meters, or 1000 meters. The search radius can be selected by the first user 205 or the second user 215.

In some cases, the system 200 can provide proximity alerts, such as notifying a user when one or more other users are within a predetermined distance from the user. In an example, such other users may be selected by the user or selected by the system 200 based on various commonalities, such as, e.g., common likes, interests and/or friends in common.

Figure 19A:
Figure 19B:
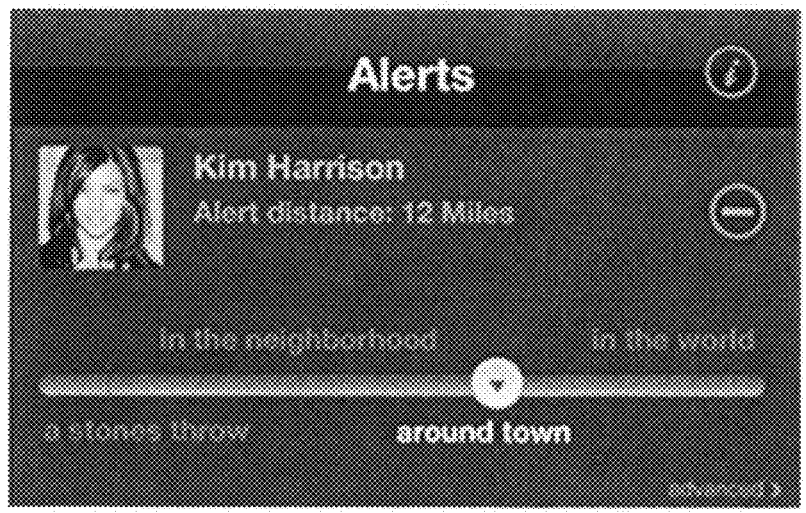

In some cases, a first user can select an alert distance for a second user. This can permit the system to alert or otherwise notify the user in instances in which the second user is within a predetermined distance from the first user. With reference to FIG. 19A, in a graphical interface screenshot, a user has initiated an advanced alert for another user ("Kim Harrison") with the other user is within a distance of 12.3 miles from the user. In FIG. 19B, in another screenshot, the user has initiated a basic alert for the other user ("Kim Harrison") when the other user is within the same city ("around town") as the user.

Figure 3:
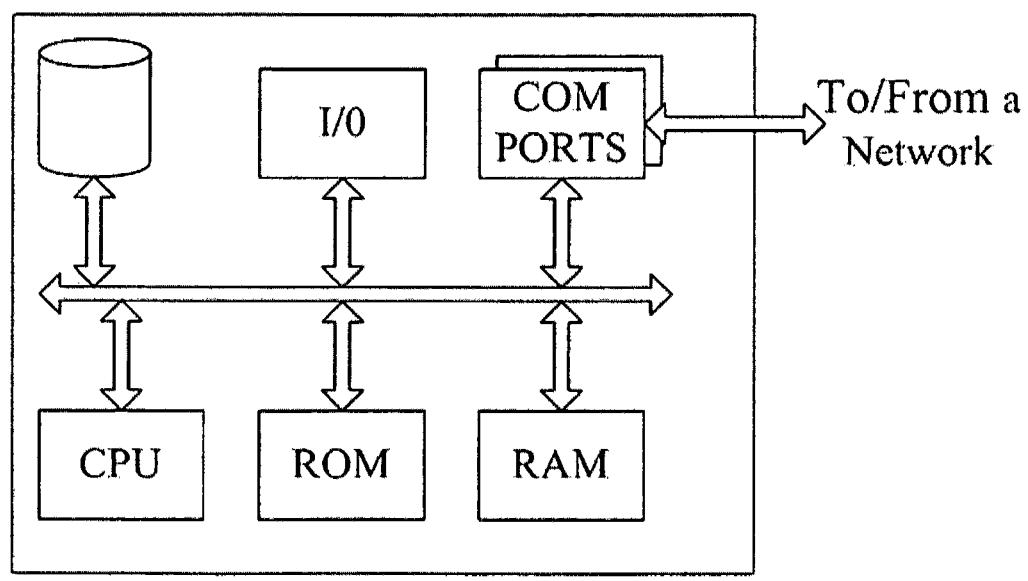
FIGS. 3 and 4 show functional block diagram illustrations of general purpose computer hardware platforms configured for use with systems and methods provided herein, in accordance with various embodiments of the invention.
Figure 4:
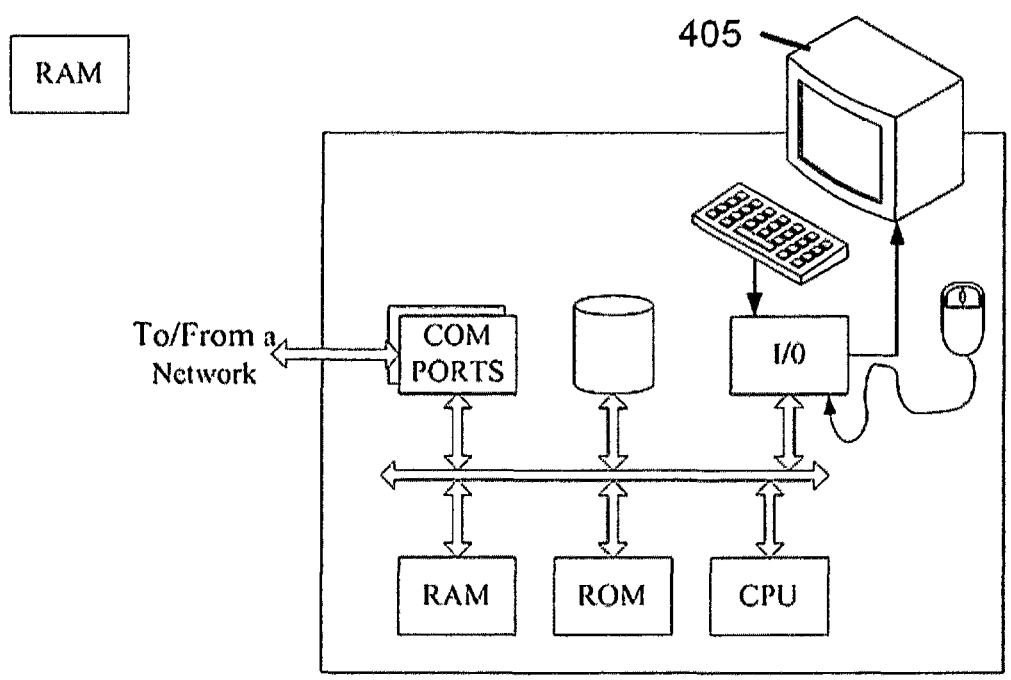

Systems and provided herein can be implemented on computer hardware platforms. FIGS. 3 and 4 show functional block diagram illustrations of general-purpose computer hardware platforms configured for use with systems provided herein. FIG. 3 illustrates an example of a network or host computer platform, as can be used to implement a server, in accordance with an embodiment of the invention. FIG. 4 depicts a computer 400 with user interface elements, as can be used to implement a personal computer or other type of work station or terminal device, in accordance with an embodiment of the invention. The computer 400 includes a display 405 with a user interface for presenting information (e.g., matched users) to a user. In some cases, the computer 400 of FIG. 4 can also act as a server if appropriately programmed. In other cases, the computer 400 of FIG. 4 can be an electronic device, such as a portable electronic device. It is believed that those skilled in the art are familiar with the structure, programming and general operation of such computer equipment and as a result the drawings should be self-explanatory.

A server, for example, can include a data communication interface for packet data communication. The server can also include a central processing unit (CPU), in the form of one or more processors, for executing program instructions. The server platform can include an internal communication bus, program storage and data storage for various data files to be processed and/or communicated by the server, although the server can receive programming and data via network communications. The hardware elements, operating systems and programming languages of such servers are conventional in nature, and it is presumed that those skilled in the art are adequately familiar therewith. Of course, the server functions can be implemented in a distributed fashion on a number of similar platforms, to distribute the processing load.

Hence, aspects of the methods outlined herein can be embodied in programming. Program aspects of the technology can be thought of as "products" or "articles of manufacture" typically in the form of executable code and/or associated data that is carried on or embodied in a type of machine-readable medium. "Storage" type media can include any or all of the tangible memory of the computers, processors or the like, or associated modules thereof, such as various semiconductor memories, tape drives, disk drives and the like, which can provide non-transitory storage at any time for the software programming. All or portions of the software can at times be communicated through the Internet or various other telecommunication networks. Such communications, for example, can enable loading of the software from one computer or processor into another, for example, from a management server or host computer into the computer platform of an application server. Thus, another type of media that can bear the software elements includes optical, electrical and electromagnetic waves, such as used across physical interfaces between local devices, through wired and optical landline networks and over various air-links. The physical elements that carry such waves, such as wired or wireless links, optical links or the like, also can be considered as media bearing the software. As used herein, unless restricted to non-transitory, tangible "storage" media, terms such as computer or machine "readable medium" refer to any medium that participates in providing instructions to a processor for execution.

Hence, a machine-readable medium can take many forms, including but not limited to, a tangible storage medium, a carrier wave medium or physical transmission medium. Non-volatile storage media include, for example, optical or magnetic disks, such as any of the storage devices in any computer(s) or the like, such as can be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media can be involved in carrying one or more sequences of one or more instructions to a processor for execution.

Figure 5:
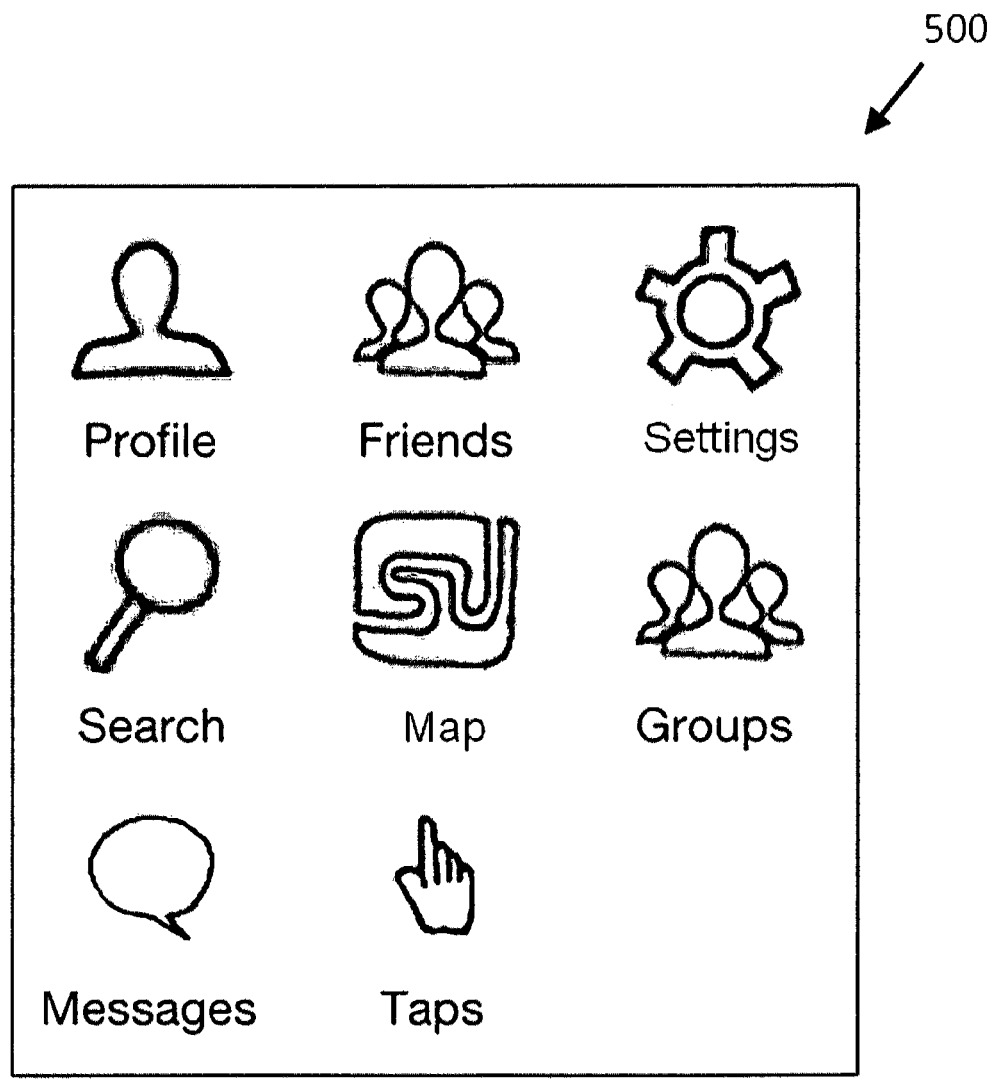
FIG. 5 shows a geo-location system having various modules, in accordance with an embodiment of the invention.

FIG. 5 illustrates a graphical user interface (GUI) 500 on a user's electronic device, in accordance with an embodiment of the invention. The GUI 500 can be implemented on systems provided herein. In some cases, the GUI 500 is implemented on a system separate from a geo-location system (such as, e.g., system 200 of FIG. 2), such as a portable electronic device operatively coupled to the geo-location system. In such a case, the system can communicate with the geo-location system to permit the user to find other users. In other situations, the GUI is implemented on the geo-location system. The system can communicate with other geo-location systems, such as other geo-locations systems installed on other users' electronic devices, to enable the user to search for and find other users. In an embodiment, the system can be part of a larger system on the user's electronic device.

The GUI permits the user to interact with one or more modules on the geo-location system or an electronic device of the user that is operatively coupled to the geo-location system. In some cases, each module can be configured to interact with the geo-location system, such as to build a user profile, search for other users, or send and receive messages to and from other users. The one or more modules can permit the user to search for and find other users.

With continued reference to FIG. 5, the GUI 500 includes a Profile module, Friends module, Settings module, Search module, Map module, Groups module, Messages module and Taps module. In an embodiment, each module is a sub-system on the user's electronic device. Each module can be configured to communicate with a module on the geo-location system. For example, the Profile module can communicate with a profile module on the geo-location system. In such a case, if the user builds, edits or removes a profile with the aid of the Profile module, the user directly makes such a change in the geo-location system.

The GUI 500 can be implemented on a touchscreen of an electronic device of a user. In some cases, the GUI 500 is implemented on a capacitive or resistive touchscreen of an electronic device of a user.

With continued reference to FIG. 5, each module includes an icon on a main (or "Home") screen of the GUI 500. The Profile module can permit the user to build, update and remove a profile of the user, which can include the user's age, sex, interests (e.g., social interests, sports interests, food interests), work-related information and education-related information. The Friends module can permit the user to add one or more friends to a network associated with the user. The Settings module can permit the user to configure one or more settings of the GUI 500, such as, e.g., search radius, on-line status (i.e., the user is on-line or off-line), which users can see the user when the user is within a predetermined distance from other users, and which users can see the user's name. The Search module can permit the user to search for other users in a predetermined location. The Groups module can permit the user to form user groups, such as, for example, work groups, school groups, groups of social interest to the user and entertainment groups. The Messages module can permit the user to send a message to one or more other users. The user can initiate a group chat using the user's user groups. For example, the user can have a group chat with users (e.g., work members) in the user's work group.

In some embodiments, the Taps module is configured to permit a user to electronically tap one or more other users, in accordance with methods provided herein (see below). As an example, if a user searches for and finds another user of interest, the user can tap the other user to initiate communication with the other user. In an embodiment, the user can select the amount of information the user desires to disclose to the other user upon tapping the other user. For example, the user can choose to keep the user's full profile hidden and only reveal the user's first name, last name, or first and last names, to the other users. As another example, the user can choose to disclose on the user's first name, last name, first and last names, or nickname to the other user, but keep the user's location hidden from the other user.

User electronic devices can communicate with each other and/or geo-location systems in various ways. In an embodiment, one electronic device, including a portable electronic device, can communicate with another electronic device with the aid of a wired or wireless communication system. In another embodiment, one electronic device can communicate with another electronic device with the aid of Bluetooth. For example, one electronic device can communicate with another electronic device through a Bluetooth connection to the other electronic device. As another example, one electronic device can communicate with another electronic device through a Bluetooth connection to a communication system that enables one device to communicate with the other device. In another embodiment, one electronic device can communicate with another electronic device with the aid of a radiofrequency (RF) connection. In another embodiment, one electronic device can communicate with another electronic device with the aid of a router (or network router), such as a wireless router (e.g., WiFi router) or wired router (i.e., both devices are connected to the router through a physical network connect, such as wires). For example, two communications devices can connect to a wireless router and communicate with one another through the wireless router.

In some embodiments, systems provided herein, including user interfaces (e.g., GUI's) of systems, enable a user to search or navigate by one or more of shared likes, interests, friends, badges, education, employment, followers, work history, circles data, degree of separation and other commonalities or criteria. For instance, a first user can browse or search for other users based on likes, interests and/or friends in common with the first user, or, alternatively, for users that do not have likes, interests and/or friends in common with the first user. The system can enable the first user to select likes, interests and/or friends to use to conduct a search for other users.

Methods for Tapping Users

In another aspect of the invention, methods for tapping (or "electronically tapping") users are provided. Methods for tapping users enable a first user to communicate with a second user with a message and profile information selected by the first user. The first user can communicate with the second user in a geographic location selected by both the first user and the second user. Methods for tapping users can be implemented (or facilitated) by systems provided herein.

In some embodiments, methods for tapping users include a first user preparing a message directed at a second user. The first user selects one or more profile information to include with the message. The first user then sends the tap, including the message and the one or more profile information, to the second user. In an embodiment, the one or more profile information can include information from a profile of the first user, such as the first user's age, sex, location, educational information, work-related information, interests, in addition to the first user's location within a user-selected geographic location.

Figure 6:
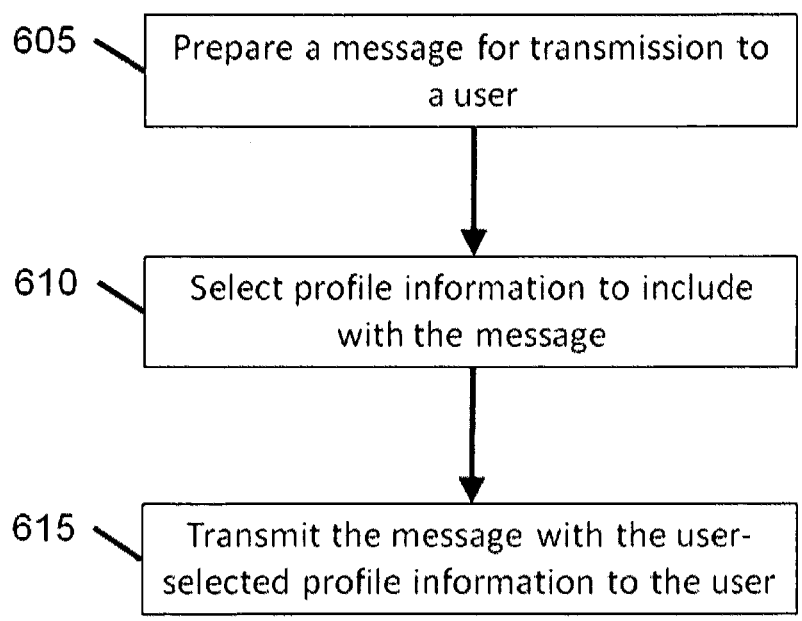
FIG. 6 shows a method for tapping a user, in accordance with an embodiment of the invention.

With reference to FIG. 6, a method 600 for tapping users is provided, in accordance with an embodiment of the invention. In a first step 605, a first user prepares a message for transmission to a second user ("user", as illustrated). The message can include one or more of text, image, sound, or video information. Next, in a second step 610, the first user selects profile information to include with the message. The profile information is selected from a profile of the first user. The profile of the first user can include one or more of the first user's name, including one or more of the first user's first name, middle name, last name; the first user's sex; the first user's education information; the first user's work information; the first user's social interests; the first users sports interests; and the first user's activities. Next, in a third step 615, the first user transmits (or sends) the message with user-selected profile information to the second user. In an embodiment, the first user can elect to not provide any information to the second user. In another embodiment, the first user can provide the first user's location to the second user.

In an embodiment, after receiving a tap from the first user, the second user can send the first user a message or tap the first user. The second user can tap the first user in the same or similar manner in which the first user tapped the second user. In another embodiment, upon receiving a tap from the first user, the second user can elect to block the first user, thereby preventing the first user from communicating with the second user (i.e., tapping the second user, sending the second user a message).

In an embodiment, after receiving a tap from a first user with certain information, the second user can request additional information from the first user, such as a location of the first user. In another embodiment, after receiving a tap from a first user, the second user can provide additional information to the first user or request additional information from the first user.

In some embodiments, a geo-location is provided that can enable a user to provide profile information (e.g., age, sex, address, education information, work information, social interest information) and adjust the level of privacy (see below) with respect to the user's profile. In an embodiment, the user can elect to reveal no, limited, some or all profile information to other users. In another embodiment, the user can elect to reveal categories of information to other users. For example, the user can reveal to other users that the user has provided to the system (via the user's profile) the user's age, sex, education information and work information. In another embodiment, the user can provide categories of information to the system, and the system can enable other users to tap the user with a request for the details of the categories of information.

In an embodiment, the geo-location system can indicate to a user what information has been provided by another user to the system. A first user, upon searching for and finding a second user, can tap the second user and request additional information from the first user. For example, the geo-location system can indicate to the first user that the second user has a profile with e-mail, work and education information, but the details of such information has been elected by the second user to remain hidden from view by other users, including the first user. The first user can prepare a tap to the second user with a message (e.g., "Hi, I'm at Lucy's Café too. Can you tell me more about yourself?"), information about the first user (e.g., age, sex, education information and work information), and a request for additional information from the second user (e.g., a request for the second user's work and education information). The system can enable the first user to indicate which of the second user's information the first user desires to view. Upon receiving the tap from the first user, the second user can elect to ignore the first user, block the first user from contacting the second user, or respond to the first user's tap with a communication (e.g., a message or tap) with certain profile information selected by the second user. The system can enable the second user to respond to the first user's request for additional information, in addition to enabling the second user to request additional information from the first user.

In an embodiment, a tapping method is provided for enabling users to gain information from others users without exchanging messages. In such a case, a first user can tap a second user with certain profile information of the first user selected by the first user. In some cases, the first user can indicate additional information about the second user desired by the first user. For example, the first user can indicate on a list of categories of profile information (e.g., "e-mail", "sex", "age", "education", "work", "interests", "location") one or more information about the second user the first users wishes to view. The second user, upon receiving the first users tap, can respond to the first users request by indicating which information the second user will enable the first user to view. The response can come by way of a tap from the second user to the first user. With the tap from the second user to the first user, the second user can request additional information from the first user.

Privacy Control

Some embodiments of the invention provide systems and methods for enabling privacy control over user searches and/or interactions. This can permit a user to control which other users can see the user in a search of a particular geographic location.

In some cases, a user can select one or more other users that can see the user in a search. The user can select which profile information of the user will be accessible by other users upon searching for the user within a geographic location. For instance, the user can indicate that the user's profile is not accessible by any user, in which case the user would be hidden and would thus not be displayed in a search of another user. As another example, the user can indicate that only the user's name and location is accessible by another user. Other users may contact the user to request additional information, such as one or more of the user's age, sex, profession and interests.

Figure 20:
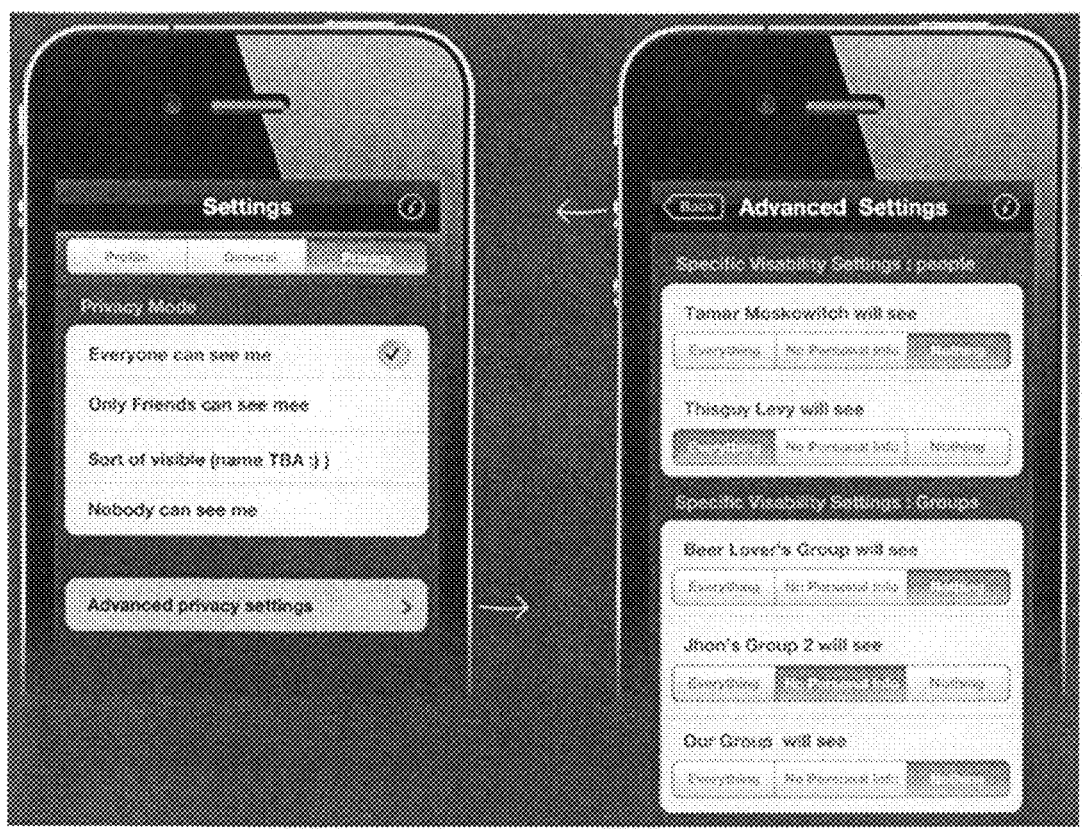

FIG. 20 is a screenshot of a graphical user interface showing privacy settings, in accordance with an embodiment of the invention. Under basic settings (FIG. 20, left image), a user can select a privacy mode of the user. In the illustrated example, the user can be seen by everyone ("Everyone can see me") upon a search by other users. Alternatively, the user can select which other users can see the user. For instance, the user can indicate that only the user's friends can see the user ("Only Friends can see me"), or that no one can see the user ("Nobody can see me"). Under advanced settings (FIG. 20, right image), a user can select privacy settings on a per-user basis. In such a case, the user can select which users have access to the user's identify and the level of information that each user can access. In addition, the user can provide privacy settings at the user group level—i.e., all users belonging to a particular user group ("Beer Lover's Group") will be ascribed certain privacy restrictions. In the illustrated example, users belonging to the Beer Lover's Group will not have access to any of the user's information, while users belonging to Jhon's Lover's Group will be able to see all but the user's personal information ("No Personal Info" is selected).

The privacy settings can preclude the level of information, if any, that the system will present to other users upon a search of a particular geographic location. In cases in which nobody can see the user, a search will not reveal the user in a list presented to another user.

Some embodiments of the invention enable a user to create, edit and delete a profile of the user, and to access a profile of another user. Access to other user profiles can be subject to privacy (and access) restrictions of the profiles of other users.

Some embodiments of the invention provide for alerts via tags or push notifications. In an example, a first user tags or taps a second user, and an electronic device of the second user displays a badge ("+1", "+2", etc.) adjacent to an application facilitating the communication, or a push notification on a GUI of the second user's electronic device indicating that the first user desires to communicate with the second user.

Some embodiments provide for background monitoring and updates of a user's location. In such a case, an application implementing the methods provided herein, as operating on an electronic device of a user, can run in the background and provide updates on a user's geographic location to a geolocation system operatively coupled to the electronic device. The geolocation system can then provide the user's location to other users, such as upon a user search.

In some embodiments, a user can search for and match users in a virtual environment. In such a case, users' virtual coordinates (i.e., position in a virtual environment) can be adapted to physical coordinates for use in searching for and matching users. This can be used, for example, in simulation social networks and video games, such as FarmVille.

Histories and Alerts

Some embodiments provide user histories. Such histories can be stored in a memory location of a system, and collected with the aid machine-executable code implemented using one or more processors.

In some cases, systems provided herein store locations visited by a user and/or other users, and provide that location history information to users upon request. In some cases, the location history information of a first user is provided to other users if the other users have permission to view the location history of the first user.

In some embodiments, a geolocation system, such as any system provided herein, stores one or more locations visited by a user as a function of time. Such locations can include businesses and schools, to name a few examples. In some cases, such locations are indoor or partially indoor locations, or other venues of or associated with businesses, schools, social activities, government and/or defense units. The system can then provide the location history information for view by other users. In some cases, the system enables all other users to view the location history information of a user. In other cases, the system enables select users to view the location history of a user, such as those having permission to view such information, as may be provided by the user's privacy settings.

Such features can enable a user to predict a next likely location of a particular user. In some cases, the system determines a next likely location of a first user, and provides the next likely location to a second user, including a user having permission to access the next likely location of the first user.

In some cases, the system provides the location history of a user on a graphical user interface (GUI) of the system. In an example, the system displays locations visited by the user as a function of time (e.g., restaurant at 8 PM, bar at 9 PM, lounge at 11 PM). Such histories can be displayed on a map of the GUI.

In some cases, location histories can indicate which other users a user has passed by or interacted with, and in some cases the closest proximity to such other users at a particular point in time.

The system can also provide status histories, which can include status updates, in addition to statuses preceding the last-in-time updates. In some cases, the system provides a "smoke trail" feature in which the system provides a user updates on other users, such as locations visited by the other users in a predetermined period of time, or the last location visited by the other users.

Some embodiments provide user alerts, such as location-based alerts. In some cases, an alert can be provided to a first user in cases in which a second user is in proximity to the first user, such as within about 1000 meters, 100 meters, 50 meters, 40 meters, 30 meters, 20 meters, 10 meters, 5 meters, 1 meters or less of the first user. In other cases, an alert can be provided to the first user if the second user visits a geolocation selected by the first user, such as a business, school or venue of social interest to the first user.

In some cases, systems provided herein can enable a user to determine the number of users at a particular location. In an example, a user can select a favorite bar and use the system to determine the number of users that are at the bar, and in particular, which users are at the bar. Such information can be provided as a function of time, which can be used for business metrics, such as determine when a particular location is more frequented by users. In addition, such location can be subject to privacy settings. For instance, some users can elect to have their identifies hidden from view by other users, but the system can present other users with a total number of users in a particular geolocation, including the hidden user. In some cases, a GUI of the system includes a counter to inform a user of the number of users at the location. In some situations, a user can sort other users at the location, such as by likes and/or interests.

In some embodiments, systems are configured to provide a network with the aid of a meta network. In some cases, systems provided herein can form networks by leveraging other networks, such as at least 1, 2, 3, 4, 5, 6, 7, 9, 10, or more other networks. In an example, a system provided herein can form a network by leveraging five networks. Such meta networks can enable automation, such as searching for other users based proximity or commonalities, as may be selected by keywords.

EXAMPLES

FIGS. 7-32 show various screenshots of examples of graphical user interfaces (GUI's) and features of geolocation and communication systems and methods. The GUI's of the illustrated examples can be implemented on geolocation systems provided herein. The screenshots were taken from an Apple® iPhone®. In the illustrated examples, and unless otherwise specified, a first user ("User 1") has employed the geo-location system to find other users. In some example, User 1 interacts with a second user ("User 2").

Example 1

Figure 7:
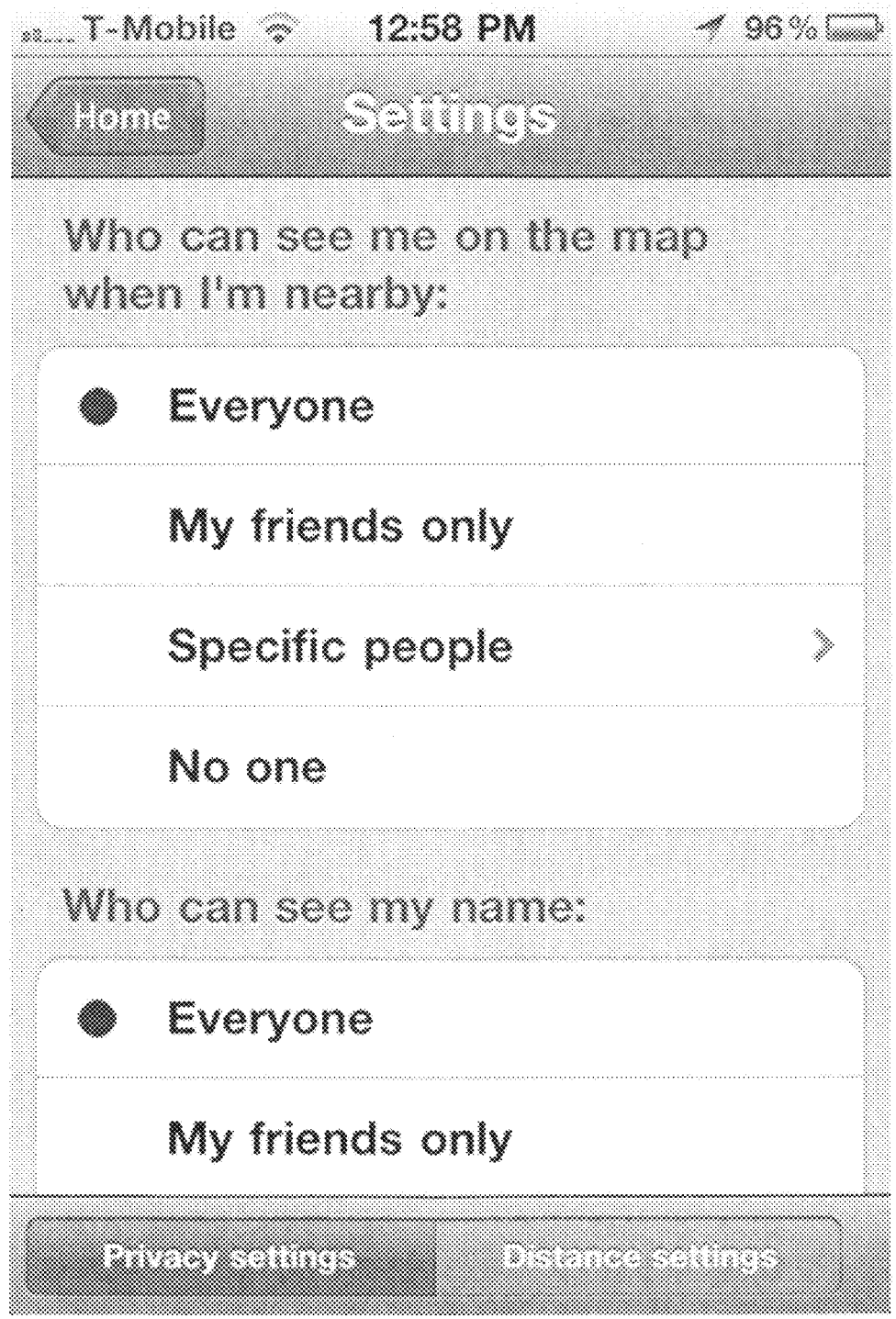
FIGS. 7-32 are screenshots exemplary graphical user interfaces (GUI's).

FIG. 7 is a screenshot of a Settings module to enable a user to adjust privacy settings and distance settings. Under privacy settings, the user can designate which other users (e.g., "Everyone", "My friends only") that can see the user on a map, and further designate which other users can see the user's name.

Example 2

Figure 8:
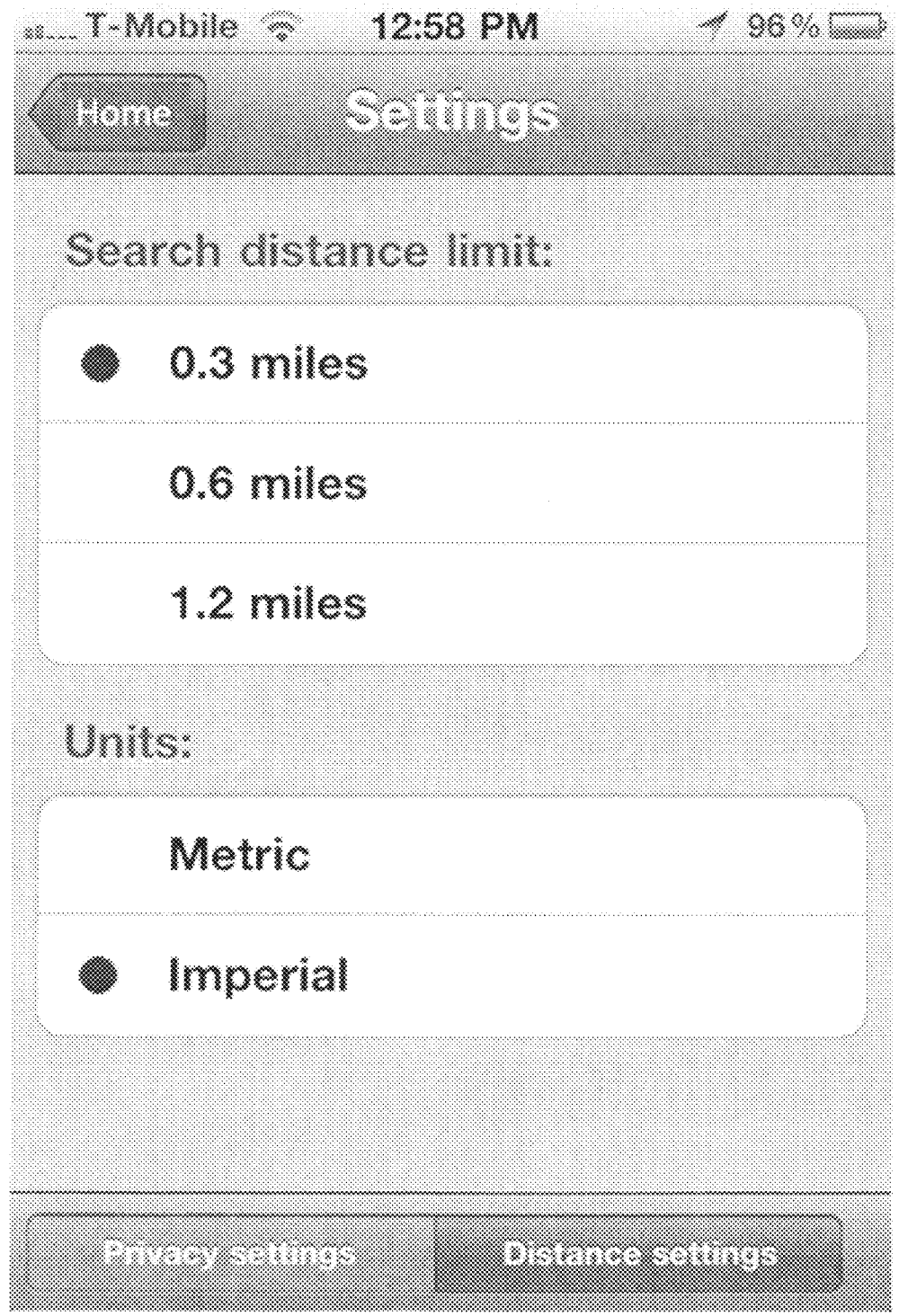

FIG. 8 is a screenshot of the Setting module showing distance settings, in accordance with an embodiment of the invention. The distance settings can permit the user to set the search radius (or search distance limit) of the geo-location system. The user can further designate the unit of measure (e.g., metric, imperial) for the search radius.

Example 3

Figure 9:

FIG. 9 is a screenshot of a Search module, in accordance with an embodiment of the invention. The Search module shows five other users matching the user ("User 1"), namely User 2, User 3, User 4, User 5 and a user whose name is hidden from User 1, and the distance of each of the other users from the user.

Example 4

Figure 10:
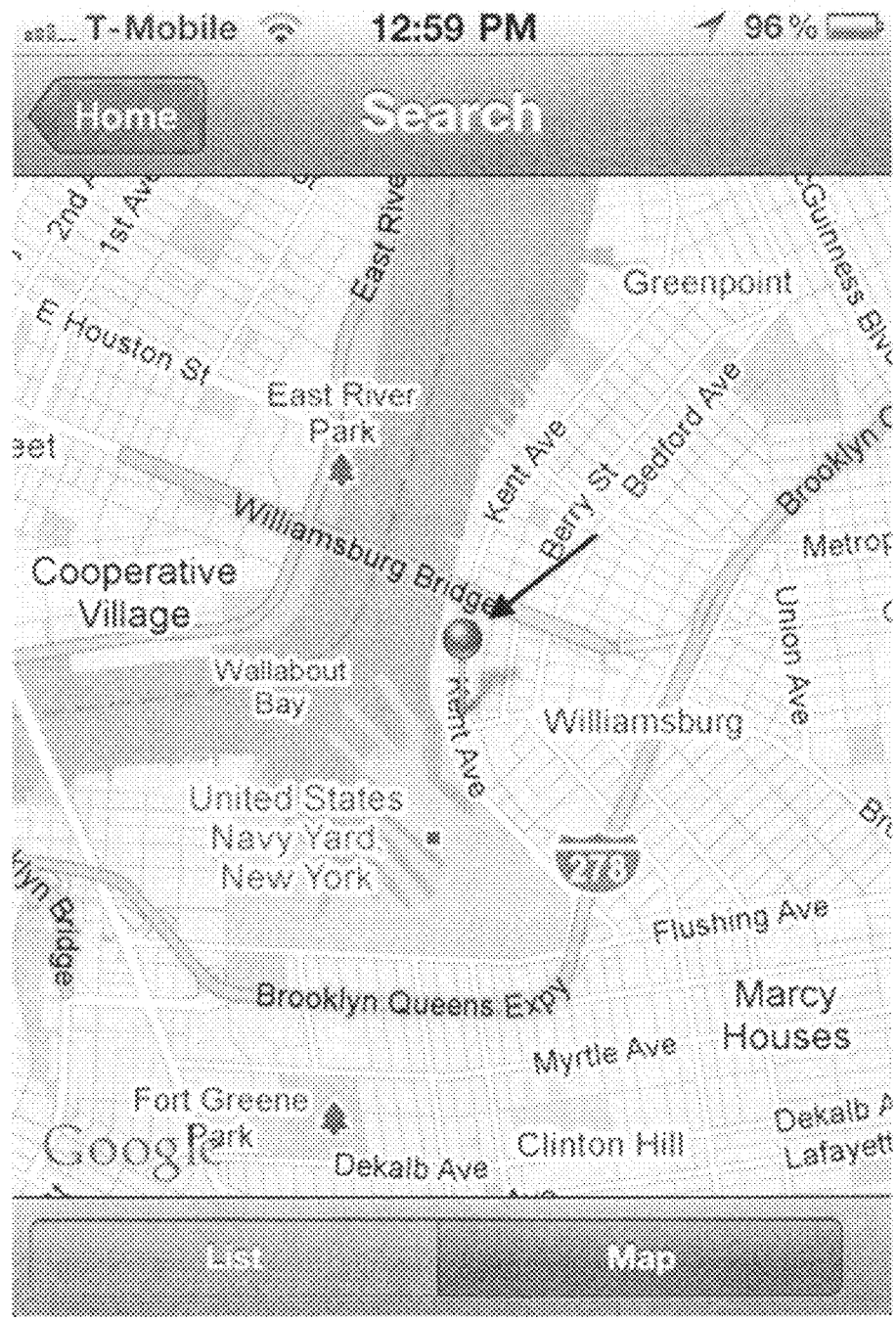

FIG. 10 is a screenshot of a map showing the location of a user matching User 1. The location of the other user is indicated by a pseudo three-dimensional pin (black arrow).

Example 5

Figure 11:

FIG. 11 is a screenshot of a Messages module, in accordance with an embodiment of the invention. User 1 has sent or received ("exchanged") one or more messages with each of three users, namely User 6, User 7 and User 8. For example, User 1 has sent User 6 a message having the string "Let's talk tomorrow."

Example 6

Figure 12:
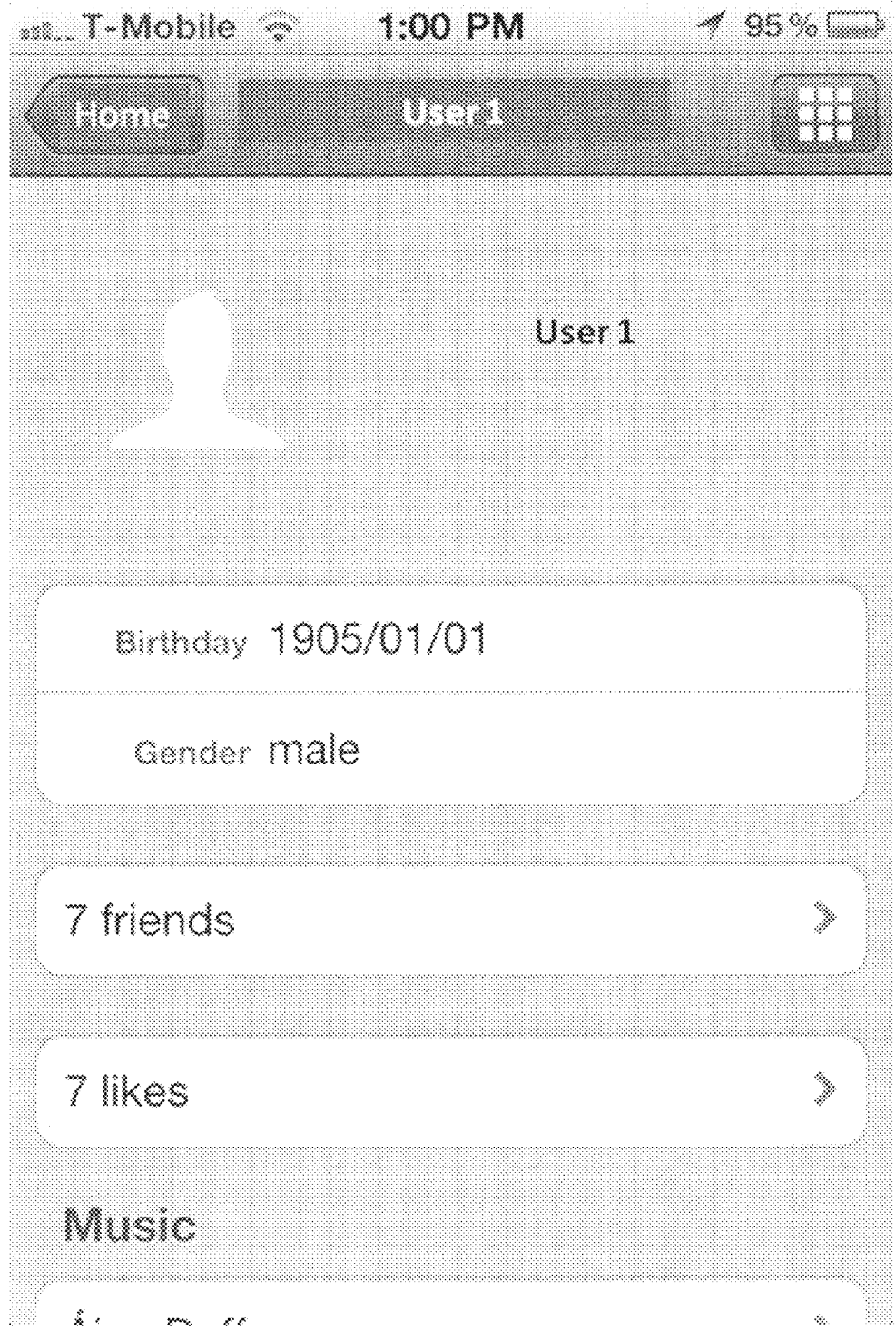

FIG. 12 is a screenshot of a Profile module of User 1, showing certain information included in a profile of User 1, in accordance with an embodiment of the invention.

Example 7

Figure 13:
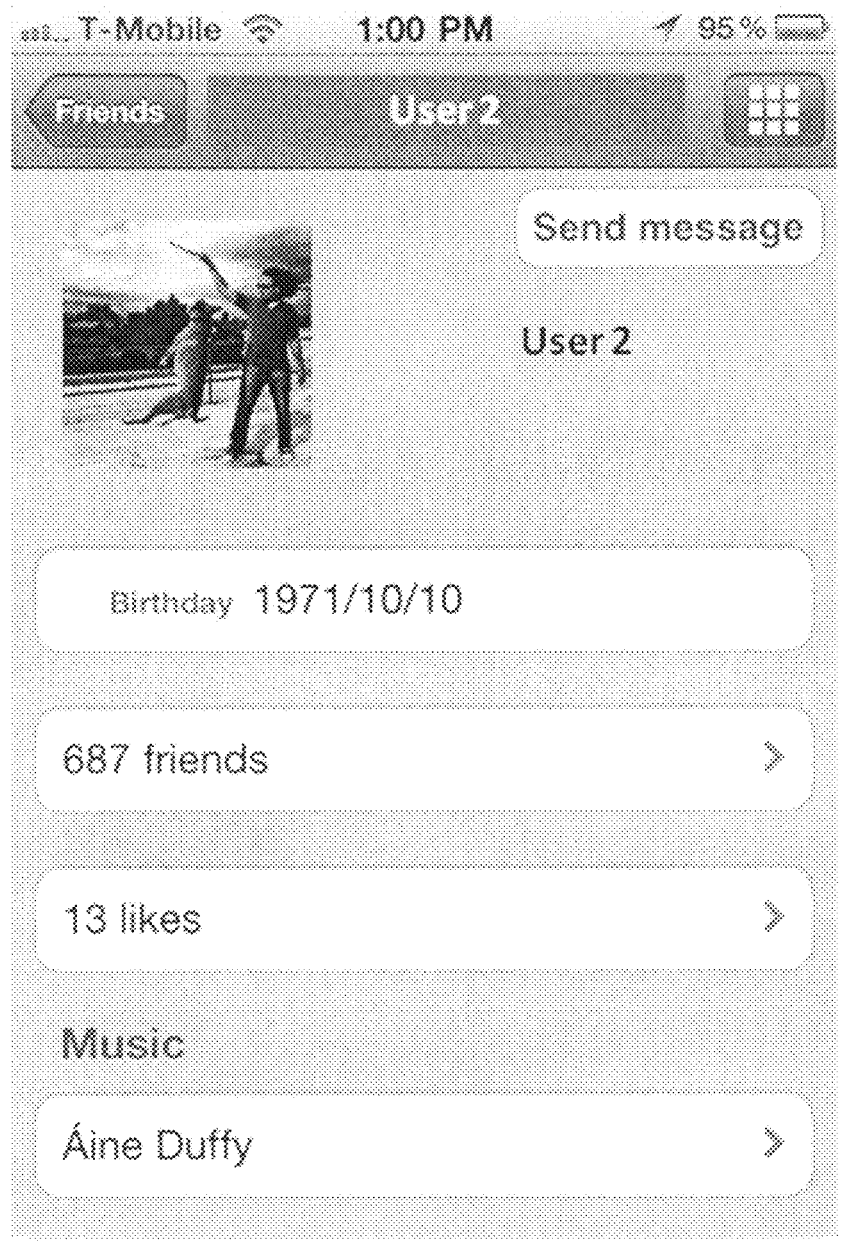

FIG. 13 is a screenshot of a profile of User 2, showing certain information included in User 2's profile, in accordance with an embodiment of the invention. The profile of User 2 is revealed following a user search by User 1 with the aid of the geo-location system. The system enables User 1 to send User 2 a message.

Example 8

Figure 14:
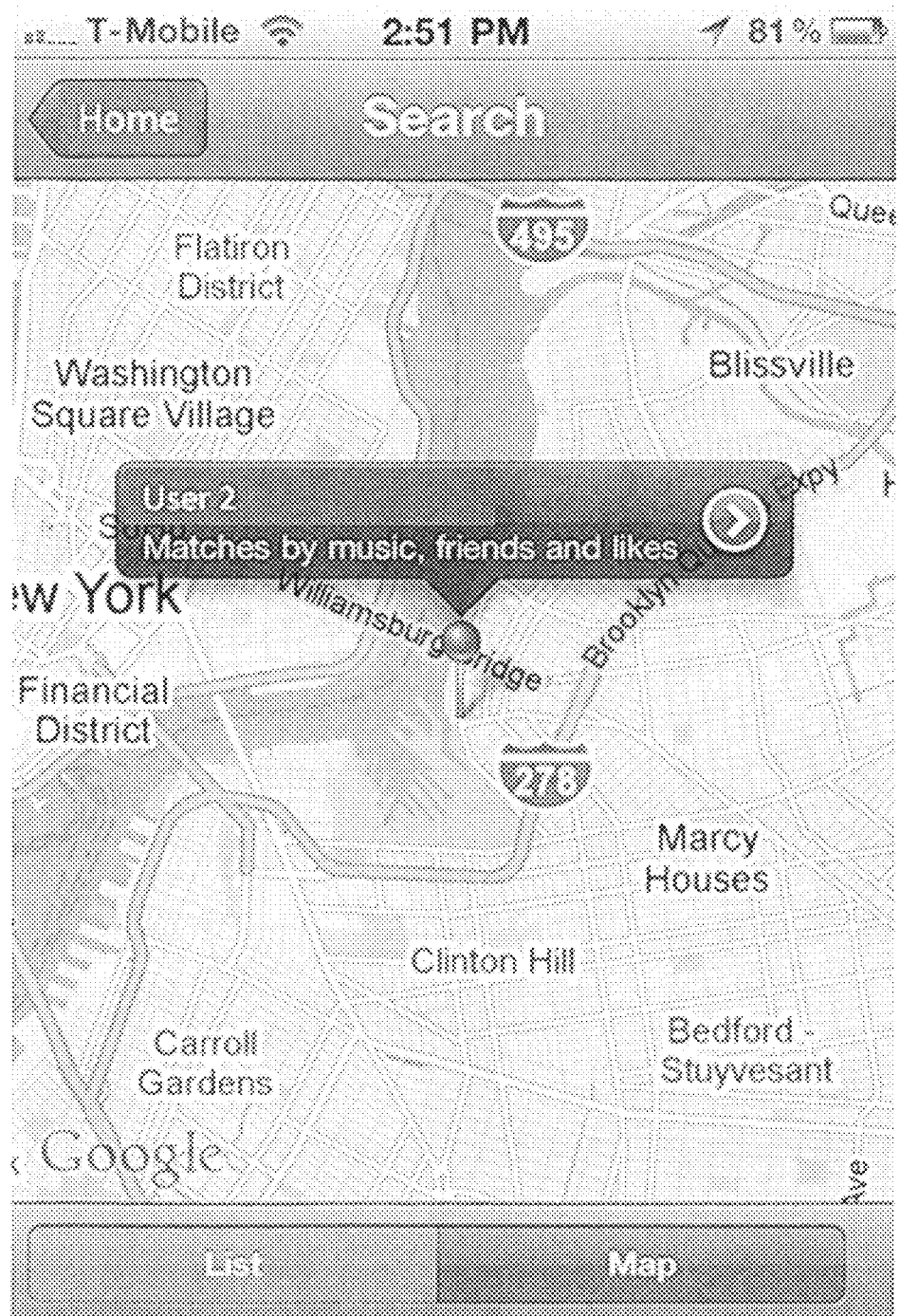

FIG. 14 is a screenshot of a map showing the location of User 2, in accordance with an embodiment of the invention. Following a search by the geo-location system, the system presents User 1 with a list of users matching User 1's search criteria. User 1 can request that the system present User 1 with a map showing the location of each user provided by the search. In the illustrated example of FIG. 14, the system has matched User 1 and User 2 on the basis of music interests, friends and other likes and interests, and provided User 1 with a map showing the location of User 2. The map shows other geographic features, such as streets, bridges, a river and highways.

Example 9

Figure 15:
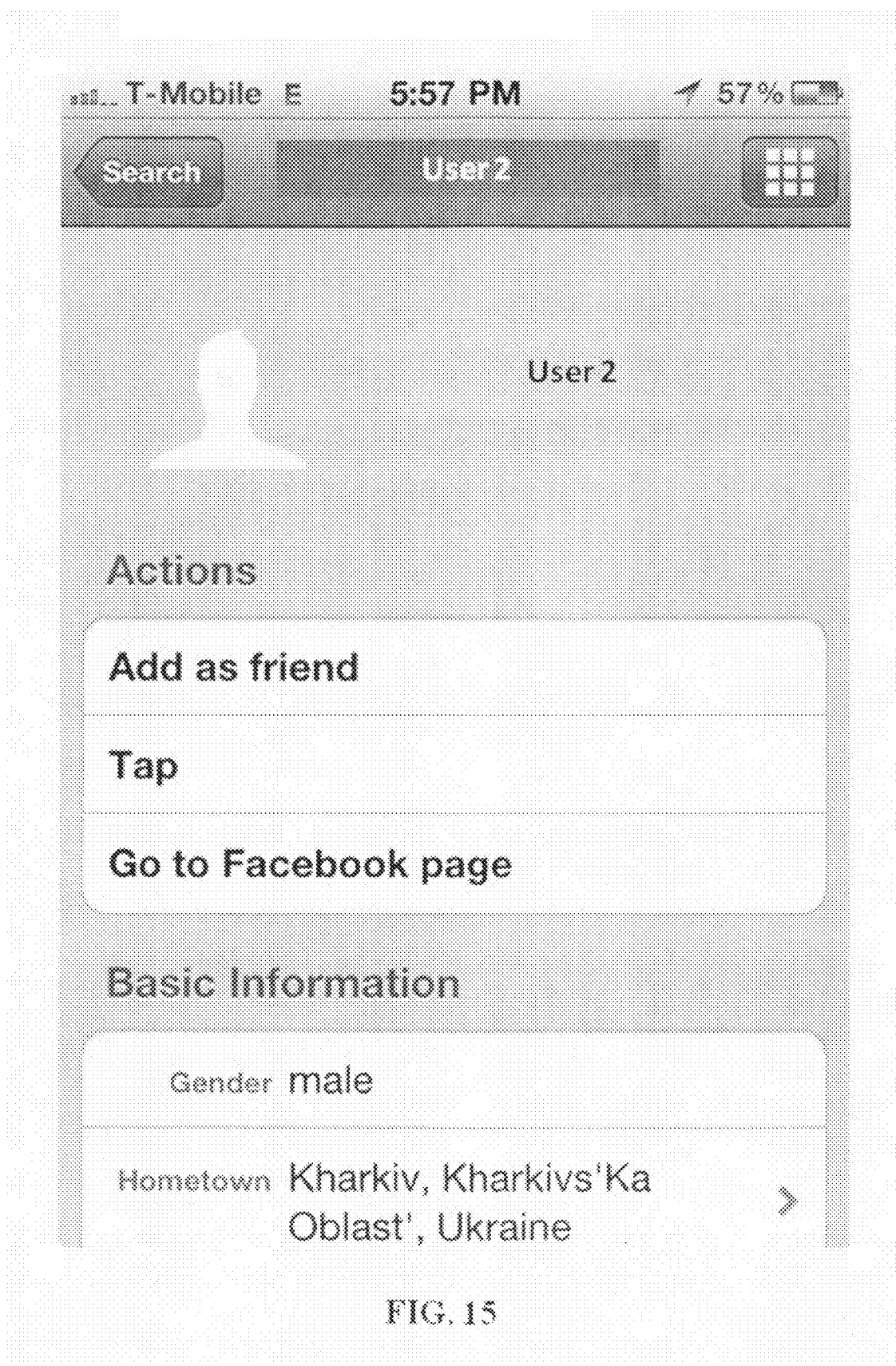

FIG. 15 is a screenshot of a profile of User 2, in accordance with an embodiment of the invention. The profile of User 2 can enable User 1 to add User 2 as a friend (or send User 2 a request to add User 2 as a friend), tap User 2, or view a social network profile (e.g., Facebook® or Foursquare, or Gowalla profile) of User 2. The profile of User 2 also includes information about User 2, such as, for example, User 2's sex and hometown.

Example 10

Figure 16:
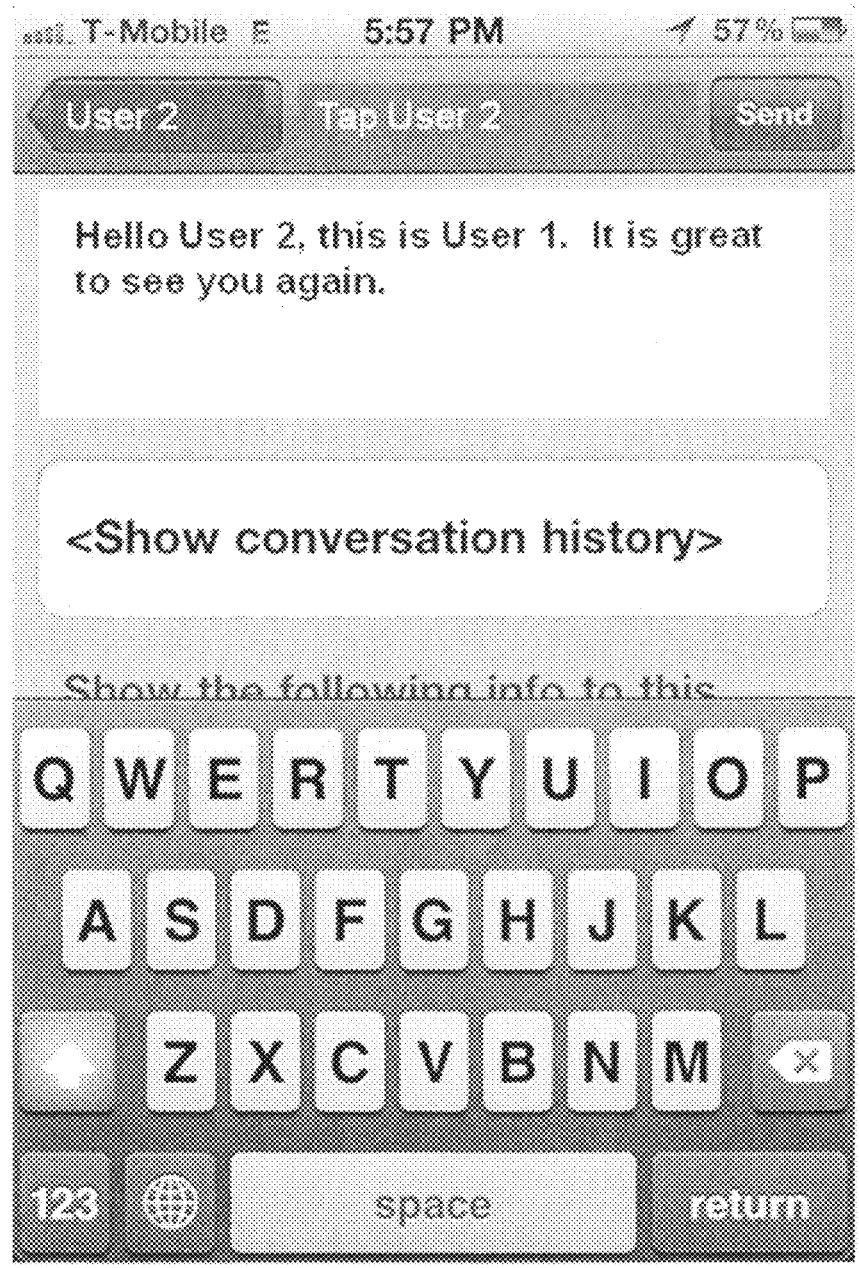

FIG. 16 is a screenshot of User 1 tapping (or "electronically tapping") User 2, in accordance with an embodiment of the invention. The screenshot shows a tap window, which enables User 1 to prepare a message to send (or transmit) to User 2. In the illustrated tap of User 2, User 1 has prepared a message to send to User 2. The message, as illustrated, includes the string "Hello User 2, this is User 1. It is great to see you again". The system can enable User 1 to prepare a message with the aid of a QWERTY keyboard, as illustrated. The system also provides User 1 a conversation history between User 1 and User 2. The system can enable User 1 to select profile information to transmit to User 2 upon sending User 2 the message prepared by User 1.

Example 11

Figure 17A:
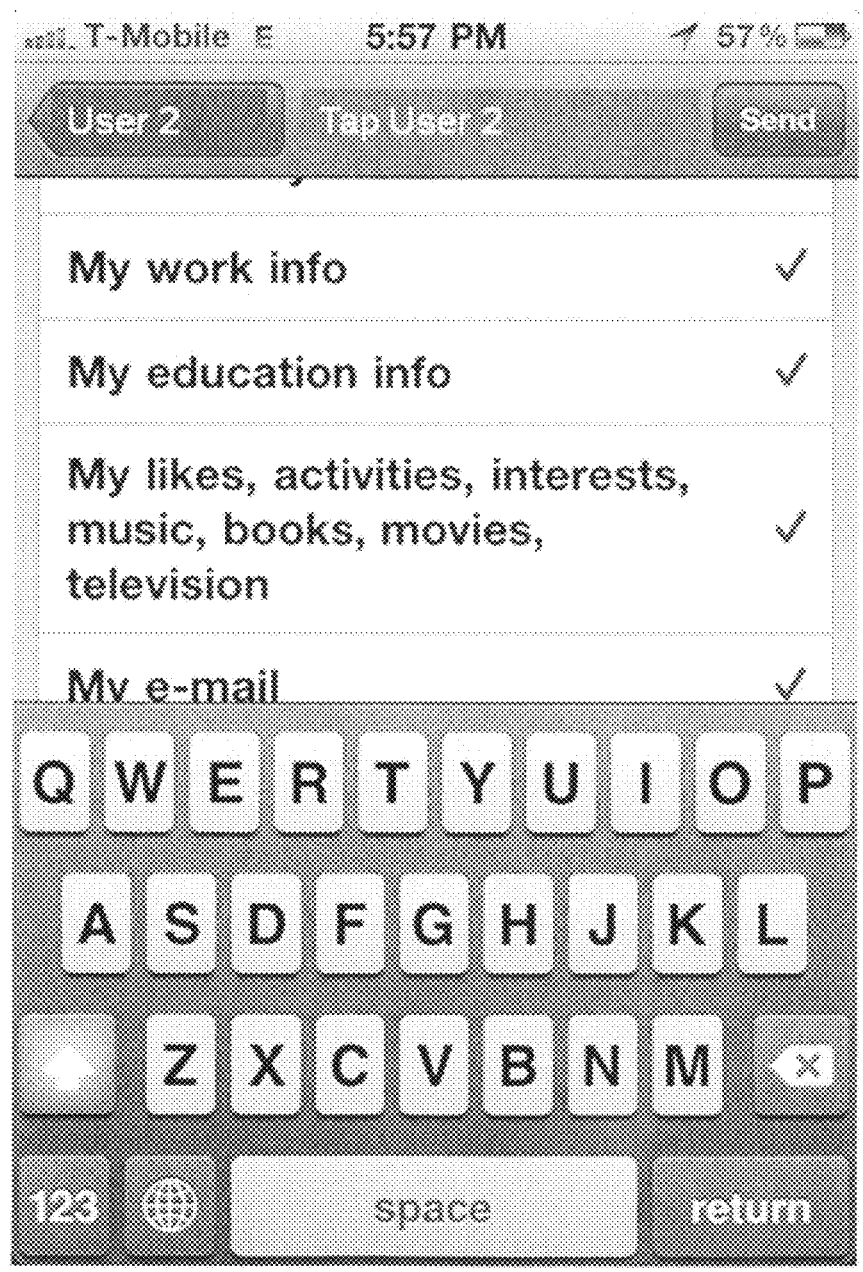
Figure 17B:
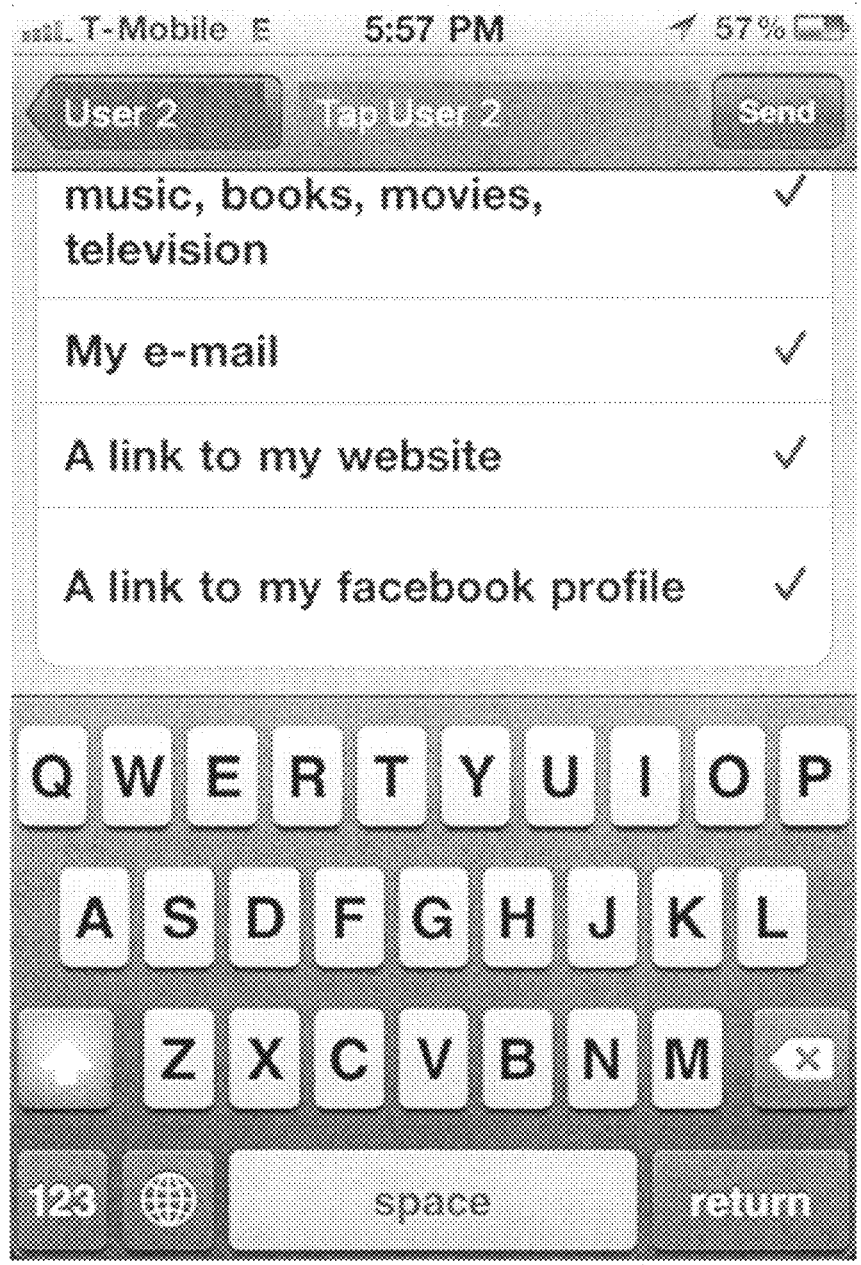

FIGS. 17A and 17B are screenshots showing a window in which User 1 can provide profile information to transmit to User 2 upon sending User 2 a message (see FIG. 14), in accordance with an embodiment of the invention. User 1 has selected to send User 2, among other things, User 1's work information, education information and e-mail address, in addition to a link to User 1's Facebook® profile. In FIGS. 17A and 17B, profile information selected by User 1 has been indicated with a check mark to the right of the profile information.

Example 12

Figure 18A:
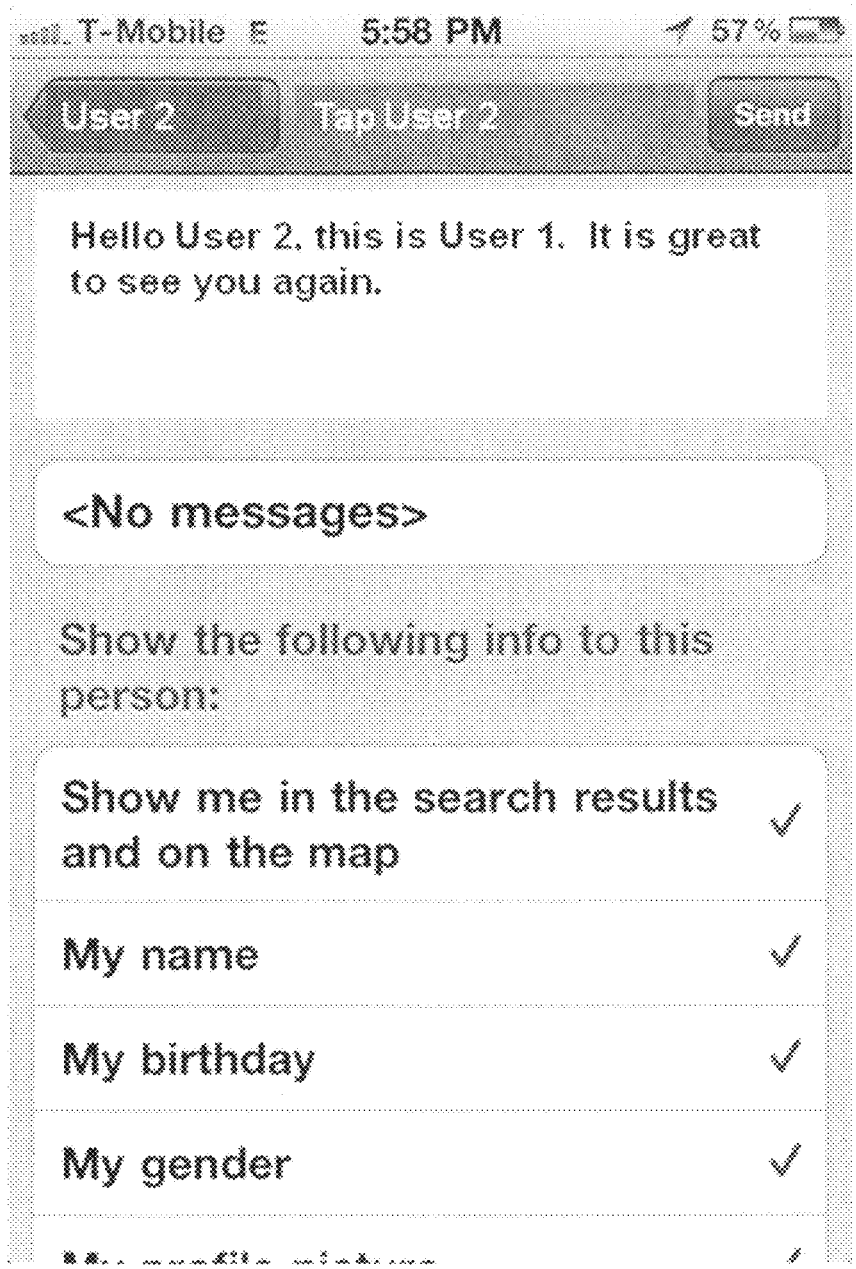
Figure 18B:
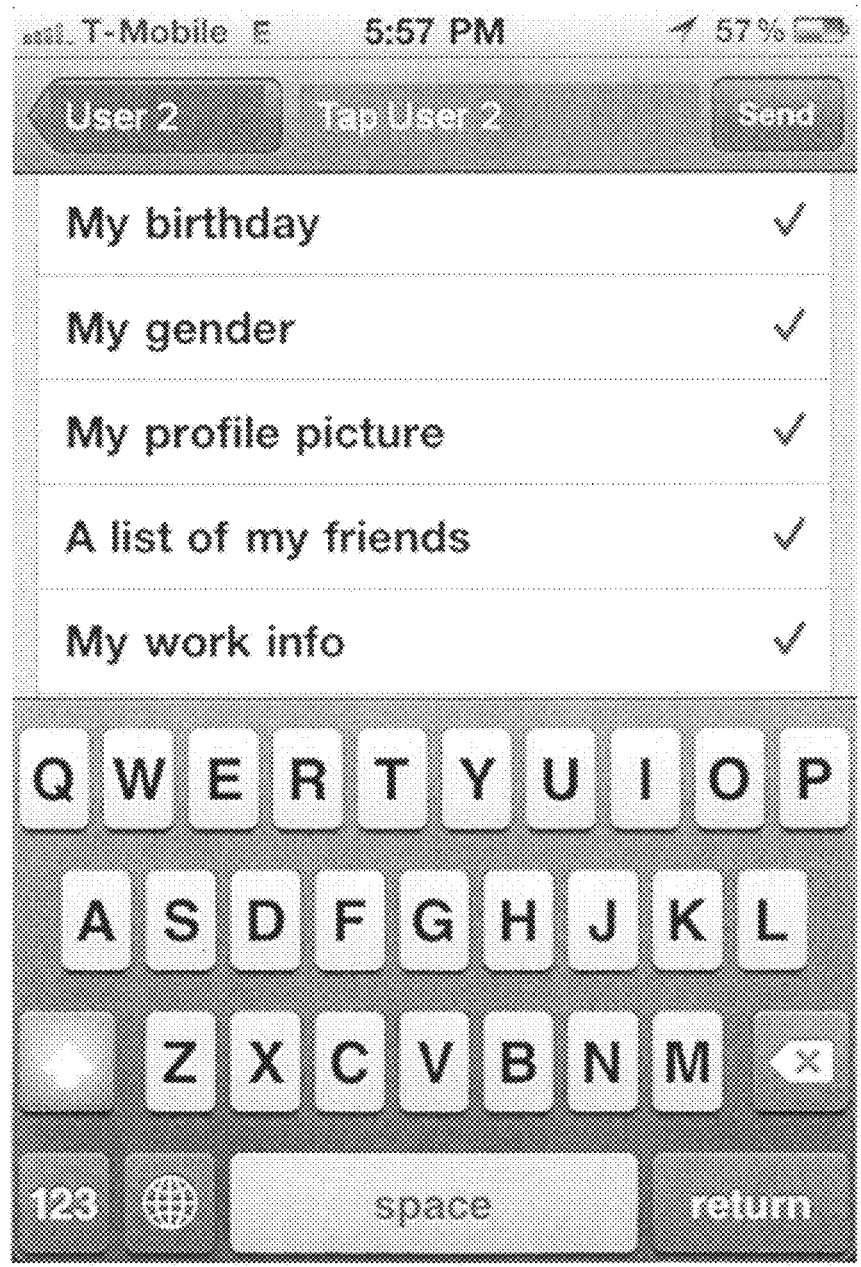

FIGS. 18A and 18B are screenshots of User 1's tap window prior to sending a message and certain profile information to User 2, in accordance with an embodiment of the invention.

Example 13

Figure 21:
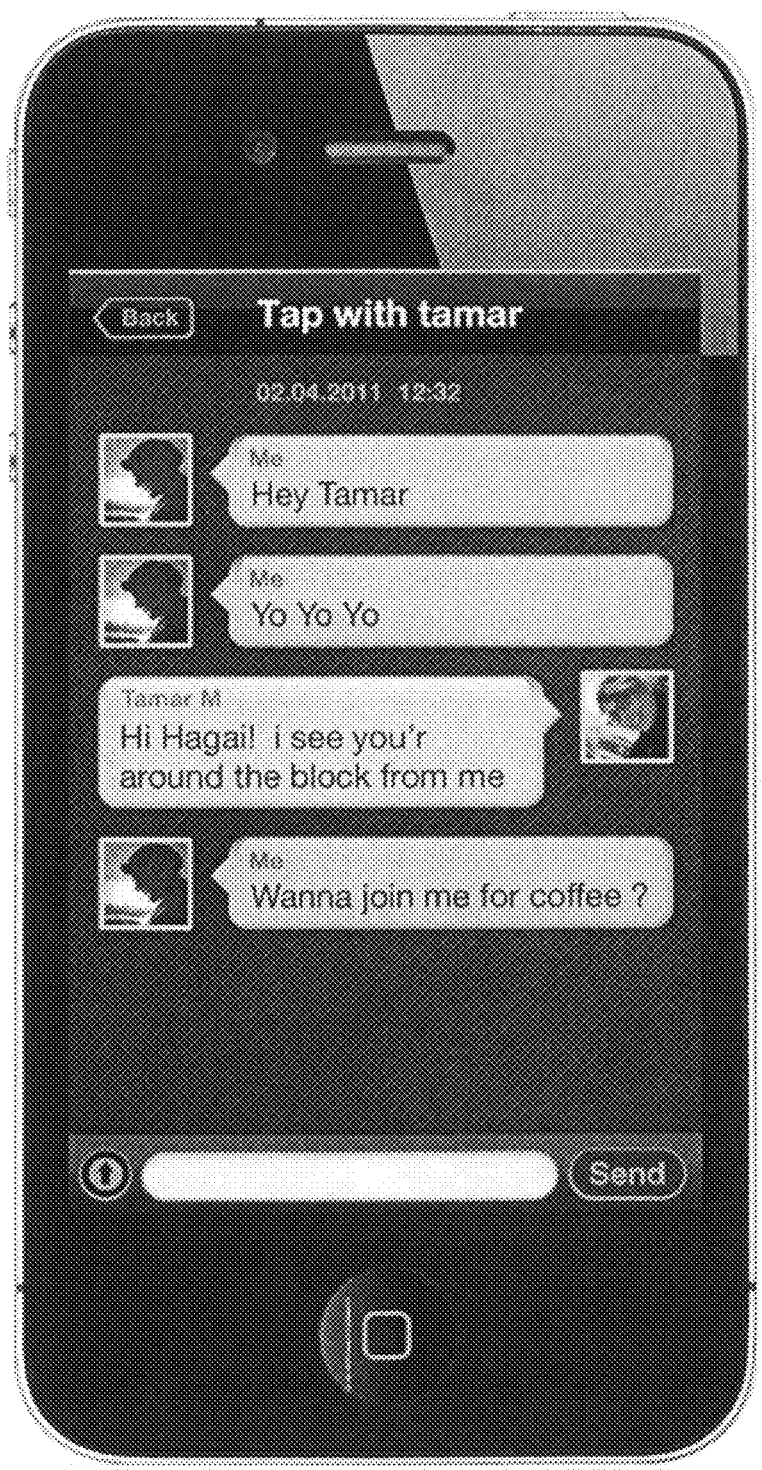

FIG. 21 is a screenshot of a first user (left) communicating with a second user (right) upon the first user having searched for users in a geographic location selected by the first user. In the illustrated example, tapping is enabled after the system has determined that the first user is able to communicate with the second user, such as if the privacy settings of the second user enable (or do not prevent) the first user from communicating with (e.g., tapping) the second user.

Example 14

Figure 22:
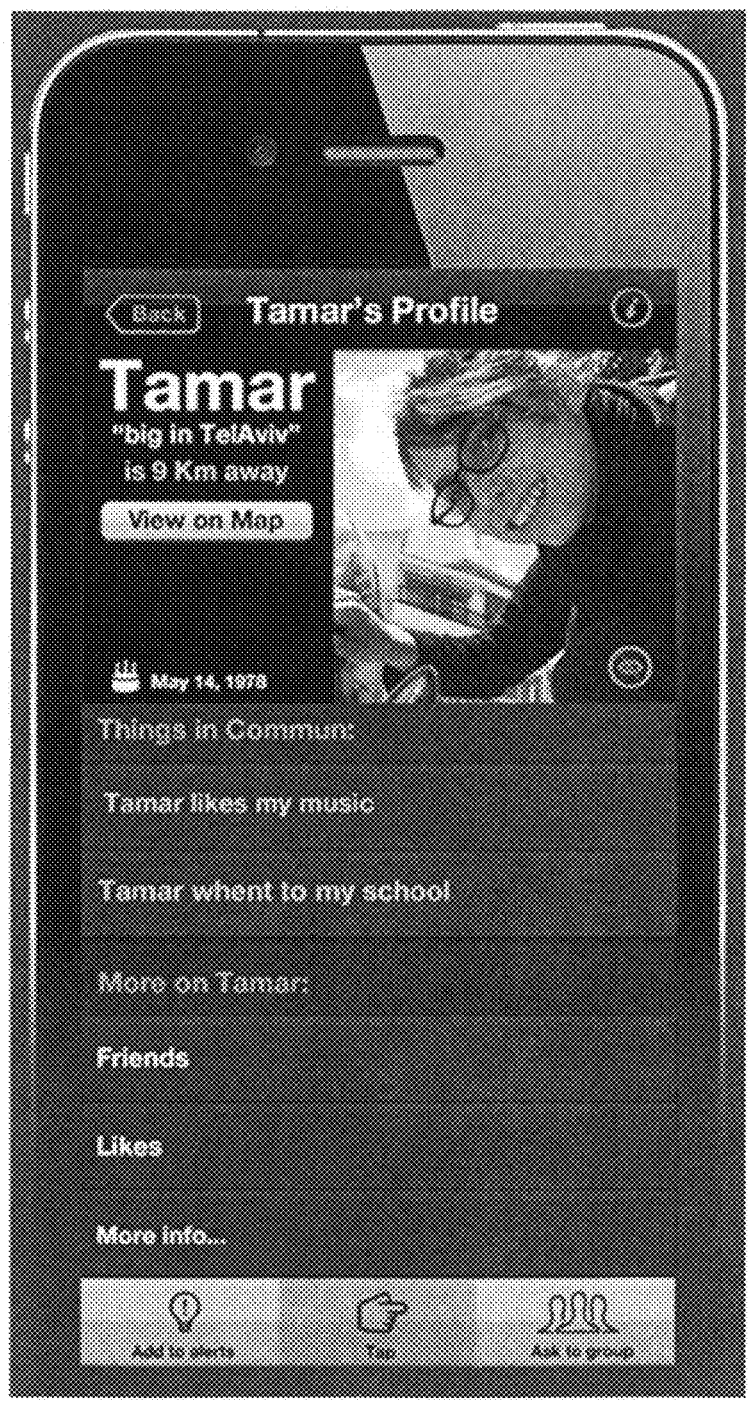

FIG. 22 is a screenshot of a GUI showing a profile of a first user ("Tamar") as revealed upon a search for the first user by a second user. The first user's profile shows the first user's picture, as may be selected by the first user for display to other users. The GUI enables the second user to see the first user's location on a map. The first user's profile enables the second user to see information that the first and second user have in common, such as social interests, business information and education. In the illustrated example, the GUI indicates that the first user likes the second user's music, and that the first and second user went to the same school. The GUI also enables the second user to see the first user's friends and other interests ("Likes"). Access to such information of the first user by the second user may be subject to access restrictions, as may be defined by the first user's privacy settings.

The GUI enables the second user to add an alert ("Add to alerts"), which can enable the system to notify the second user when the first user is at a predetermined distance from the second user (see, e.g., FIGS. 19A and 19B). In addition, the GUI enables the second user to communicate with ("Tap") the first user, and to request permission from the first user to be added to a group selected by the second user.

Example 15

Figure 23:

FIG. 23 is a screenshot of a GUI displayed on a portable electronic device of a first user. The GUI shows the location of a second user at various points in time. The first user may use the map to determine a potential destination of the first user.

Example 16

Figure 24:

FIG. 24 is a screenshot of a GUI display on a portable electronic device of a first user, displaying status updates (FIG. 24, left image) of the first user ("big in Tel Aviv") and various other users (e.g., "I need Beer!"), and images of other users (FIG. 24, right image). In some cases, the status updates may be notifications or other news of the first user or other users. Such information may be presented to the first user as it arrives on the system, with the most recent information at the top of the list. Alternatively, the user may desire certain users' information to be presented on top of others, in which case those users' information can be presented at the top of the list.

Figure 25:
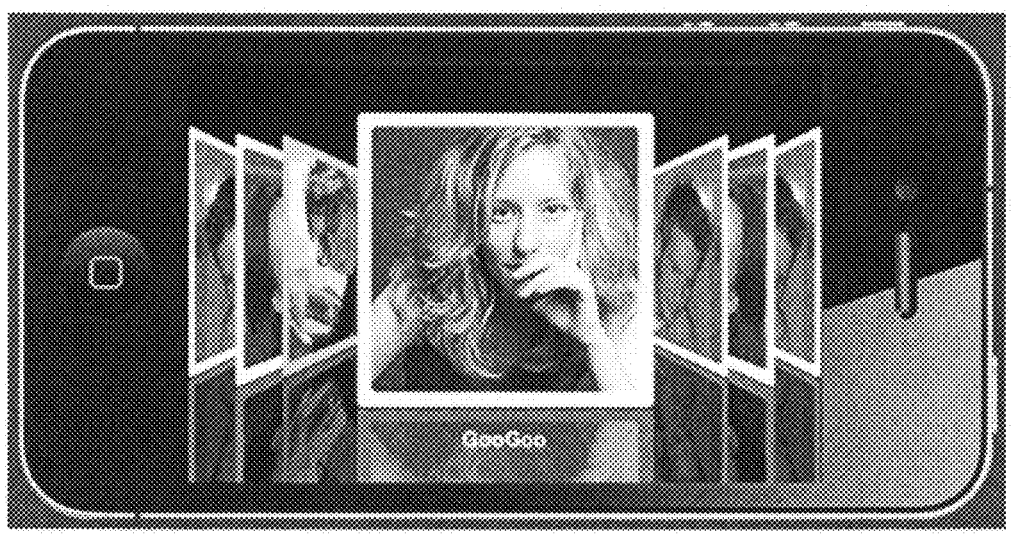

FIG. 25 is a screenshot of a GUI showing an image carousel. The image carousel can enable the first user to flip through other users' images and access other users' profiles by selecting an image of interest. The image carousel can be populated with pictures of users in a geographic location searched by the first user, and in some cases updated when new users are identified.

Example 17

Figure 26:

FIG. 26 is a screenshot of a GUI showing a home screen, as can be displayed on a portable electronic device of a first user. The home screen shows a status update (also "Buzz" herein), in addition to status updates of other users. In some cases, the home screen can display messages (e.g., taps) from other users. A menu bar at the bottom of the home screen enables the first user to access various features of the system implementing the GUI, such as the home screen ("Home"), the first user's inbox ("Inbox"), the first user's groups ("Groups"), the first user's alerts ("Alerts"), and settings ("Settings").

Figure 27:

FIG. 27 is a screenshot of the first user's inbox, which shows messages (e.g., taps) from other users. The inbox permits the first user to select sub-folders, such as an "All messages folder," "Friends requests," or "Taps." The user can select a message and delete the message or respond to the message, such as responding to a tap or accepting a friend request.

Example 18

Figure 28:

FIG. 28 is a screenshot of a GUI showing a list (FIG. 28, left) of users revealed by the geolocation system upon a search by the first user. The proximity of the first user to each user on the list is also shown. A map (FIG. 28, right) displays the physical location of each user on the list.

Example 19

Figure 29:
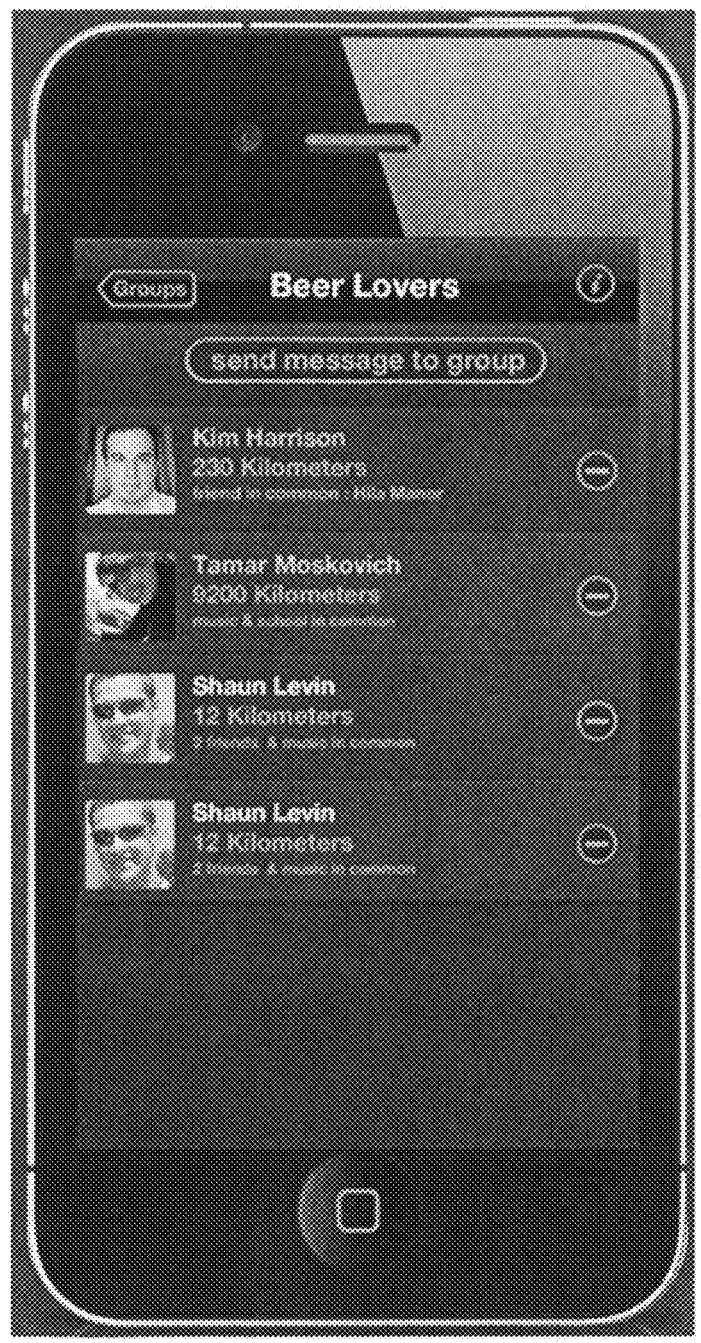

FIG. 29 is a screenshot of a GUI showing a list of users in a user group ("Beer Lovers"). The proximity of each user to the first user is indicated in each user entry.

Example 20

Figure 30:
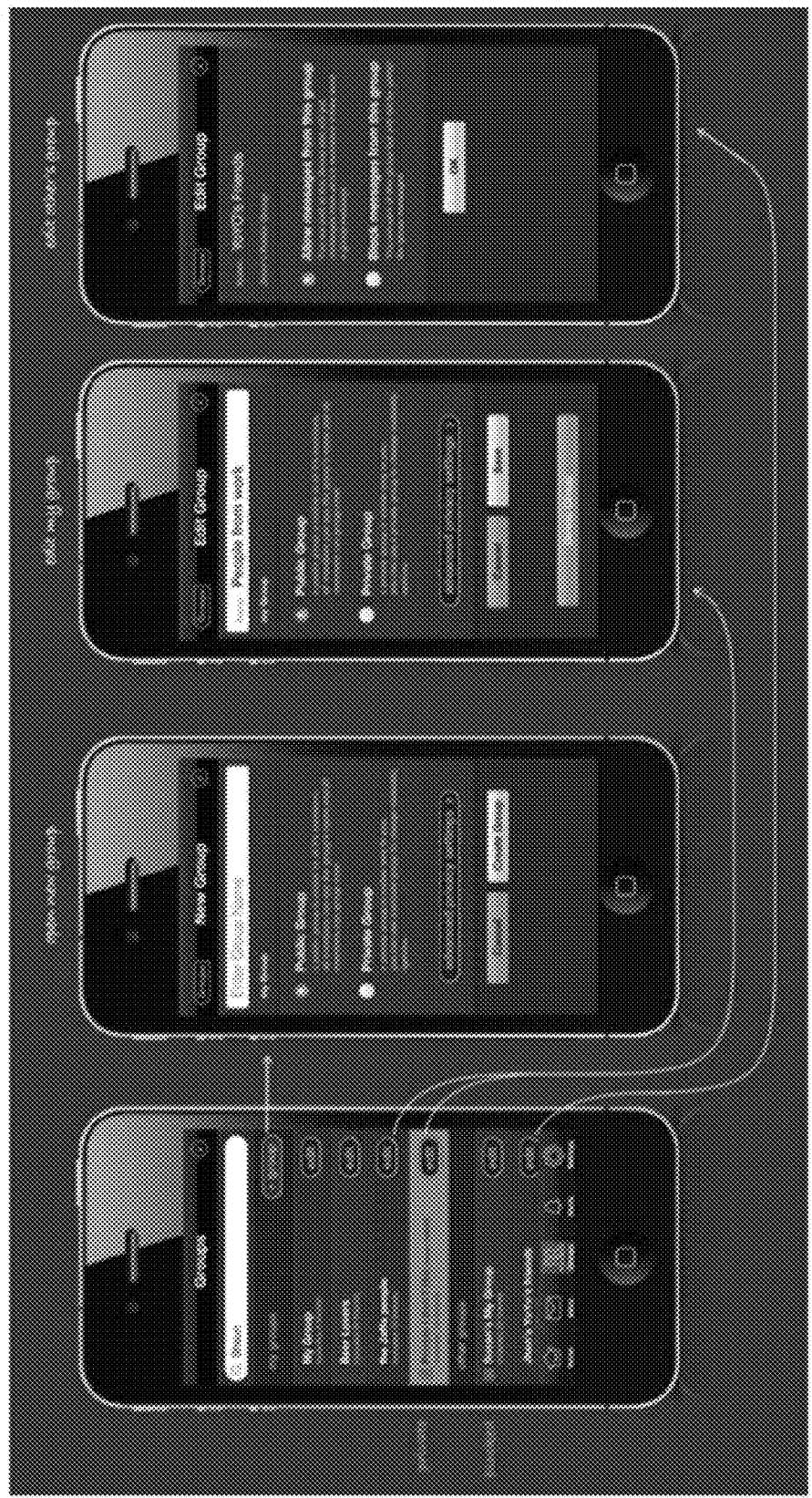

FIG. 30 shows screenshots of a GUI showing a system feature that enables the first user to edit a group. The arrows indicate a process workflow upon the first user selecting a particular option from the Groups main screen (bottom most figure). As an option, the first user can add a new group ("+group"), in which case the system will ask the first user for a name of the new group ("Enter Group Name"). The first user can indicate whether the new group is a public or private group, and also modify various privacy settings, such as whether the new group is accessible by all or select users, and whether the user can receive messages (e.g., "taps") from users listed in the group. As another option, the first user can edit an existing group. For instance, the first user can edit the Jaffa people group, which is an existing group in the illustrated example. The first user can indicate whether the existing group is a public or private group, and also modify various privacy settings, such as whether the existing group is accessible by all or select users.

Example 21

Figure 31:

The system can permit a user to filter searches. FIG. 31 is a screenshot of a GUI of a home filter, which permits the first user to filter search results with the aid of the illustrated parameters, including "everyone," "matches," "friends", "Gender," "Time frame," and "Age."

Example 22

Figure 32:

FIG. 32 is a screenshot of a GUI showing a list of groups (FIG. 32, left image) that the first user prefers ("Likes") over other groups. The first user can select a group to view the list of users in that group (FIG. 32, right image) and the proximity of each user to the first user.

Systems and methods provided herein may be combined with, or modified by, other systems and methods, such as, for example, systems and methods described in U.S. Pat. No. 6,509,830 to Elliott ("SYSTEMS AND METHODS FOR PROVIDING CUSTOMIZABLE GEO-LOCATION TRACKING SERVICES"), and U.S. Patent Publication Nos. 2002/0002053 to Nam et al. ("METHOD FOR GEO-LOCATION INTERPOLATION AND COMPRESSION") and 2010/0287103 to Mason ("SYSTEM AND METHODS FOR DISCOUNT RETAILING"), which are entirely incorporated herein by reference.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A computer-implemented method for locating and facilitating introductions between users in a plurality of geographic locations at a predetermined time, comprising:
   receiving a request from a first user to conduct a search for other users in the plurality of geographic locations pre-selected by the first user and the other users;
   matching, with the aid of a processor, said first user with a plurality of potential second users from the other users in the plurality of -pre-selected geographic locations, said first user matched with said plurality of potential second users based on matching criteria of the first user and the plurality of potential second users, wherein the matching criteria include at least one of the following: social, educational, work-related, health-related and/or food-related interest;

sending the first user a response indicating the plurality of potential second users may be at the plurality of pre-selected geographic locations at the predetermined time; and selectively transmitting an introductory communication from the first user to a selected second user that is matched with the first user when the first user elects and arrives at a selected geographic location selected from the plurality of pre-selected geographic locations by the first user and the second user, wherein the introductory communication includes at least one of the following: a greeting message; selected personal profile information related to said first user; and a request for selected personal profile information related to said selected second user.

2. The computer-implemented method of claim 1, further comprising forming a user group comprising the first user, the second user and a third user after matching the first user with the second user and the third user.

3. The computer-implemented method of claim 2, wherein the user group is formed by pairing, with the aid of a processor, the first user with the second user and the third user.

4. The computer-implemented method of claim 1, wherein matching the first user with said second user and said third user comprises searching for the second user and a third user.

5. The computer-implemented method of claim 4, wherein searching for the second user and a third user includes using search criteria specific to the second user and the third user.

6. The computer-implemented method of claim 1, wherein said matching comprises searching for said second user and a third user, and comparing user-specific search criteria provided by said first user with a profile of each of said second user and said third user.

7. The computer-implemented method of claim 1, wherein the geographic location is characterized as a location of social interest, educational interest, work-related interest, health-related interest and/or food-related interest to said first user, said second user and a third user.

8. The computer-implemented method of claim 1, wherein the geographic location is selected by the first user, the second user and a third user.

9. The computer-implemented method of claim 1, further comprising providing the first user the location of the second user and a third user in said geographic location.

10. The computer-implemented method of claim 1, wherein matching the first user and second user comprises comparing a first profile of the first user and a second profile of the second user to determine that there is a match based on predetermined matching criteria.

11. The computer-implemented method of claim 1, wherein said geographic location is an indoor geographic location.

12. The computer-implemented method of claim 1, further comprising providing the position of the second user and a third user for display on a user interface of an electronic device of said first user.

13. A computer-implemented method for searching for users in a plurality of geographic locations at a predetermined time, comprising:

communicating, with the aid of a processor, with computer systems of users associated with the plurality of geographic locations that is of social, educational, work-related, health-related and/or food-related interest to each of the users, each of the users having a user profile;

performing a processor-mediated search for users associated with the plurality of geographic locations based on search criteria provided by a first user among the users, wherein the search is directed at the user profile of each of a remainder of the users;

sending a response to the first user indicating the matched users may be at the plurality of geographic locations at the predetermined time; and delivering to two or more matched users introductory communications from the first user in the geographic location that is of social, educational, work-related, health-related and/or food-related interest to the first user and the two or more matched users, wherein the introductory communications include at least one of the following: a greeting message; selected user profile information related to said first user; and a request for selected user profile information related to said two or more matched users.

14. The computer-implemented method of claim 13, further comprising providing the position of said two or more matched users for display on a user interface of an electronic device of said first user.

15. The computer-implemented method of claim 14, wherein said user interface includes a map.

16. The computer-implemented method of claim 13, wherein said geographic location is an indoor location.

17. A computer-implemented method for bringing users together at a predetermined time, comprising:

receiving a request from a first user to search for other users in a plurality of pre-selected geographic locations selected by the first user and the other users;

searching, with the aid of a processor, for said other users in the geographic locations, wherein the search is conducted in view of search criteria provided by the first user;

matching, with the aid of a processor, the first user with a second user and a third user selected from the other users;

sending a response to the first user indicating the second and the third user may be at the pre-selected geographic locations at the predetermined time;

forming a group comprising the first user, the second user and the third user after matching the first user with the second user and the third user; and directing an electronic introductory communication from the first user to the second user or the third user, wherein the electronic introductory communication includes at least one of the following: a greeting message; a selected user profile information related to the first user; and a request for a selected user profile information related to the second user and the third user.

18. The computer-implemented method of claim 17, further comprising providing the position of each of said second user and said third user for display on a user interface of an electronic device of said first user.

19. The computer-implemented method of claim 18, wherein said user interface includes a map.

20. The computer-implemented method of claim 18, wherein the position of each of said second user and said third user is provided upon the verification of one or more privacy settings of each of said second user and said third user.

21. The method of claim 17, wherein said geographic location is of social, educational, work-related, health-related and/or food-related interest to said first user, second user and third user.

\* \* \* \* \*